(12) United States Patent
Malm et al.

(10) Patent No.: US 6,567,709 B1
(45) Date of Patent: May 20, 2003

(54) INTEGRATED MONITORING, DIAGNOSTICS, SHUT-DOWN AND CONTROL SYSTEM

(75) Inventors: Howard Malm, Coquitlam (CA); Sammy Ma, Burnaby (CA); Lorne Tuck, Chestermere (CA)

(73) Assignee: REM Technology, British Columbia (CA)

( * ) Notice: Subject to any disclaimer, the term of this patent is extended or adjusted under 35 U.S.C. 154(b) by 0 days.

(21) Appl. No.: 09/497,767

(22) Filed: Feb. 4, 2000

(51) Int. Cl.$^7$ .............................................. G05B 11/01
(52) U.S. Cl. ........................................ 700/21; 700/169
(58) Field of Search ................................ 700/67, 9, 10, 700/169, 170, 21, 286, 22, 204, 27; 717/100, 149; 425/151; 246/40.7

(56) References Cited

U.S. PATENT DOCUMENTS

| | | | | |
|---|---|---|---|---|
| 4,559,828 A | * | 12/1985 | Liszka | 340/870.28 |
| 4,724,524 A | * | 2/1988 | Thomas et al. | 700/179 |
| 5,470,218 A | * | 11/1995 | Hillman et al. | 264/40.6 |
| 6,275,741 B1 | * | 8/2001 | Choi | 700/10 |

* cited by examiner

Primary Examiner—Leo Picard
Assistant Examiner—Kidest Bahta
(74) Attorney, Agent, or Firm—Vorys, Sater, Seymour and Pease LLP; Thomas R. Boland

(57) ABSTRACT

An integrated monitoring, control and shut-down (IMCS) system for monitoring and controlling the operation of a machinery is provided. The IMCS system includes: input ports for receiving sensor signals indicative of conditions of the machinery, output ports for outputting control signals to actuators of the machinery, signal conversion means coupled to the input and output ports, for converting the input sensor signals into data samples and for converting control data into control signals. The IMCS system also includes a data processor for controlling the signal conversion means, for processing the data samples into calculated values, for sending selected calculated values to be stored into a memory and for calculating control data. A communication bus couples the hardware elements of the IMCS system. The invention can be used for monitoring, controlling, diagnosing and determining the performance of machines used to develop mechanical energy such as reciprocating engines, machines driven by a rotating shaft such as electrical generators, rotating and reciprocating compressors, rotating and reciprocating pumps, propellers (air and water), water and gas turbines, and the like. A data acquisition process for use in the monitoring and control of a rotating equipment comprising a shaft is also provided. The method comprising the steps of sampling a condition sensor output indicating a condition of the rotating equipment that requires monitoring, sampling a marker sensor indicating the rotational position of said shaft and combining the condition signal and the rotation marker signal.

21 Claims, 34 Drawing Sheets

INTEGRATED MONITORING, DIAGNOSTICS, SHUT-DOWN AND CONTROL SYSTEM

PRIORITY

The present application claims priority from Canadian Patent Application No. 2,260,695 the contents of which are incorporated herein by reference.

FIELD OF THE INVENTION

The present invention relates generally to monitoring and control systems, and more specifically relates to an integrated monitoring, diagnostics, shut-down and control system.

BACKGROUND OF THE INVENTION

Electronic systems of a machinery can perform various functions such as monitoring, diagnostics, shutdown, and control.

Monitoring refers to the ability to acquire readings from electronic sensors via analog to digital conversion or open/closed contacts of sensors and to be able to display the numerical readings or status and/or to be able to store the result by electronic means.

Diagnostics refers to the ability to determine the mechanical condition and performance of a machine from the sensors which are monitored. The diagnostic results may be determined by alarm values of sensor data, or calculated values derived from the sensor data by various mathematical techniques or by means of logic, fuzzy logic, probabilities, and/or rules implemented by software. The mechanical condition refers to the fitness of mechanical parts that form parts of the machine to perform the function required by the machine. Examples of mechanical parts may be a bearing, a valve, or a piston ring in an engine. The performance refers to the ability of the machine to perform its function such as turning a shaft at the desired speed, or to generate a flow of gas at the desired pressure and flow rate.

Shutdown refers to the ability to shutdown a machine that is operating in a condition which is considered as unsafe or likely to cause the machine to damage itself or associated machinery. An example is the shutdown of an engine with a abnormally low oil level or low oil pressure. The shutdown function causes the machine to stop operating in response to a specified signal or a combination of electronic signals from analog and/or digital sensors that sense certain machine conditions. An example is a rotational speed sensor that generates a signal when the rotational speed of a shaft exceeds a pre-determined setting which in turn causes the shutdown system to shut off the fuel or source of energy to the device causing the shaft to rotate.

Control refers to the ability of an electronic system to read an electronic analog or digital sensor signal and generate an output analog or digital signal which controls an actuator to control an attribute of the machine. An example is the control of coolant temperature with the open/close position of a valve in the coolant flow line. When the coolant temperature rises causing a high reading on the temperature sensor, the control system changes an electronic output current or voltage to open the control valve which allows more cool water to flow.

System refers to the combination of electronic hardware which can read sensor outputs, can generate control signals for actuators, contacts or switches for the purposes of control and/or enunciation, and software which causes the electronic hardware to respond in the desired manner.

In the case of machinery with reciprocating pistons, such as reciprocating engines, reciprocating compressors used for compressing gases, and reciprocating pumps used for pumping liquids, current electronic system are designed to perform a combination of the functions.

The performance of the functions of shutdown and control is currently integrated within control systems, such as systems using Programmable Logic Controllers (PLC's). Many of these control systems have the ability to perform these functions with hardware or software processes such as the proportional, integral, derivative (PID) functions. Such systems can acquire analog and digital signals and can generate analog and digital outputs. These systems generally follow a ladder logic or flow diagram method of operation. Basically the loop is repeated while the system is operating. The key feature of these systems is the ability to ensure a response within a guaranteed time (such as 0.5 s, 0.1 s). Some of the systems use a real time operating system to perform the tasks in addition to being able to perform electronic communication with other devices (RS232, RS485 etc.). However, such systems do not have the ability to acquire and manipulate analog inputs at a data rate higher than 10 to 100 times per second. As well, such systems generally do not have the computational capability to perform diagnostics beyond simple threshold alarms.

There are a number of systems available that perform monitoring using computer technology with data sampling rates well above 1000 per second. Examples of such systems are the Beta-trap On-line made by Liberty Technology, the Model 6100 made by Windrock systems, and the SCXI signal conditioning system made by National Instruments. Normally these monitoring units have the capability for communications. Some of the most advanced of these systems have software diagnostic capability. The monitoring involves the acquisition of a contiguous stream of data followed by the processing of the data to either generate a numerical result or store the data for later processing. All of these monitoring systems cannot, by the nature of their single tasking design, perform the monitoring and shutdown capabilities at the same time as the monitoring.

Because of the designs currently used for shutdown/control and monitoring/diagnostics each of them are not capable of adding the complementary capability.

There is a need in the art for a system that integrates the functions of shutdown and/or control of a machinery with the functions of monitoring and/or diagnostics of a machinery.

SUMMARY OF THE INVENTION

It is an object of the invention to provide a integrated monitoring, diagnostics, shut-down and control system for machinery.

In an embodiment of the invention, there is provided an integrated monitoring, control and shut-down (IMCS) system for monitoring and controlling the operation of a machinery. The IMCS system includes: input ports for receiving input sensor signals indicative of conditions of the machinery that require monitoring and output ports for outputting control signals to actuators of the machinery that require control. The IMCS system also includes signal conversion means coupled to the input and output ports, for converting the input sensor signals into data samples and for converting control data into control signals. Furthermore, the IMCS system comprises memory means, said memory means storing at least a software application comprising a communication protocol. The IMCS system also includes a data processor for controlling operation of the signal conversion means, for processing the data samples into calculated values, for sending selected calculated values to be stored into the memory means, for calculating control data, said data processor operating according to said software application. The IMCS further includes a communication bus coupling the data processor, the signal conversion means, the memory means, according to said communication protocol, and a power supply for providing power for the operation of the system.

The invention can be used for monitoring, controlling, diagnosing and determining the performance of machines used to develop mechanical energy such as reciprocating engines, machines driven by a rotating shaft such as electrical generators, rotating and reciprocating compressors, rotating and reciprocating pumps, propellers (air and water), water and gas turbines, and the like.

In one of its aspect, the invention also provides a data acquisition process for use in the monitoring and control of a rotating equipment comprising a shaft, the method comprising the steps of sampling a condition sensor output indicating a condition of the rotating equipment that requires monitoring, for obtaining a condition signal; sampling a marker sensor indicating the rotational position of said shaft, for obtaining a rotation marker signal; and combining the condition signal and the rotation marker signal.

BRIEF DESCRIPTION OF THE DRAWINGS

The present invention will now be explained, by way of example only, with reference to certain embodiments and the attached Figures in which.

DETAILED DESCRIPTION OF THE INVENTION

In its broad aspect, the present invention provides an on-line monitoring and control system that integrates the capabilities to perform monitoring, diagnostics, shutdown and control of a machinery. The communications capability is further integrated in a further embodiment of the invention. This system, referred herein as an Integrated Monitoring, Control and Shutdown (IMCS) system, has the capability, by its design, to perform all of these tasks simultaneously. This is achieved by a combination of software, hardware and a real time operating system (RTOS), as it will be further described.

Figure 1:
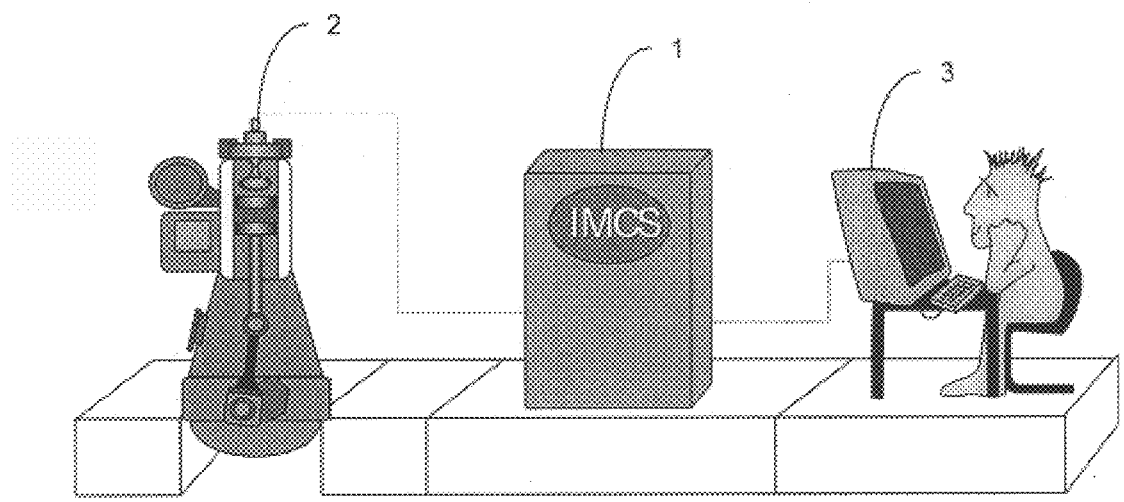
FIG. 1 is a general overview of a system for monitoring and control of a machinery.

FIG. 1 is a overview picture, meant to help in the understanding of the operation of the IMCS system 1 according to one aspect of the invention. The IMCS system 1 in FIG. 1 is an online diagnostic tool to be used in the monitoring of mechanical condition and performance characteristics of the engine/compressor 2 of a machinery. In a broad aspect of the invention, the IMCS system 1 may be self operated. Preferably, as shown in FIG. 1, it provides an user I/O capabilities 3 to alter driver/load functions. Through tabulations of sensor data, the IMCS system 1 can be used as a tool not only to detect the symptoms of a mechanical problem, but also to evaluate the root cause. Through specialised sensors, the IMCS system 1 senses abnormal sensor readings and provides productive maintenance recommendations before problem situations arise. Should an emergency develop, the IMCS system 1 recognizes it and generates an electronic signal to cause a machine shutdown or provides advisory information indicating a shutdown situation.

The IMCS system 1 provides continual on-line monitoring information for management of the machinery asset.

One use of this monitoring/evaluation process is the implementation of a predictive maintenance scheme which extends the life cycle of consumable mechanical components. The benefit is seen in cost reduction, as the use of a regular maintenance schedule often does not utilize the full operating life of consumable components.

DETAILED DESCRIPTION OF A PREFERRED EMBODIMENT OF THE INVENTION

Referring to FIGS. 2–20, the invention is described in accordance with one of its preferred embodiments. The following description is not intended to be limiting in what concerns aspects that will be recognized by a person skilled in the art as non-essential. It will be understood that various technologies used in the implementation of the preferred embodiments may be substituted for equivalent alternatives, currently existent or as they emerge. Furthermore, the preferred embodiment of the invention applies to the control of a rotating engine/compressor 2, but it will be appreciated that it could be applied to any other similar machinery.

Figure 2:
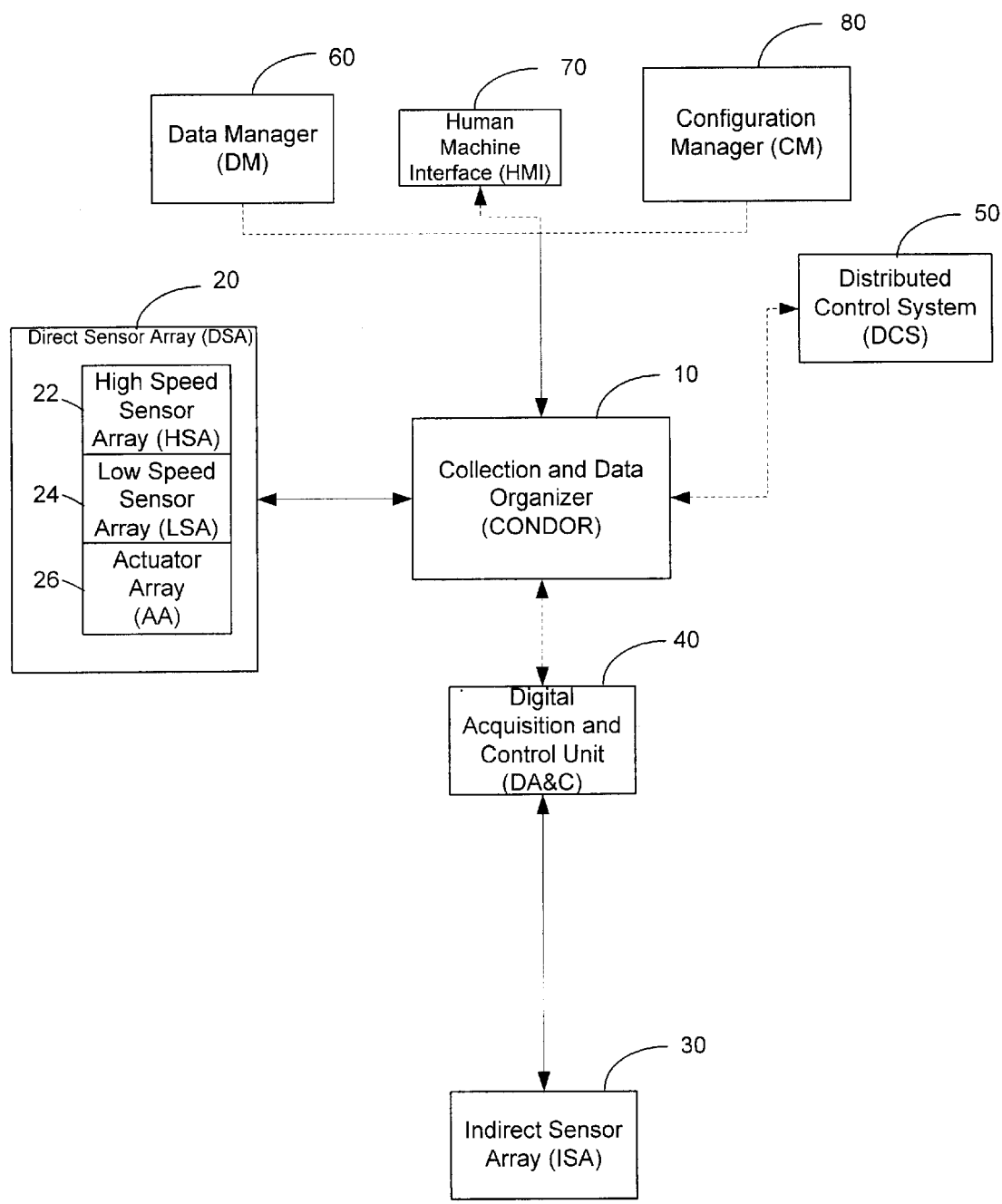
FIG. 2 is a block diagram of an integrated monitoring, control and shutdown system according to a preferred embodiment of the invention.

Referring to FIG. 2, the IMCS system 1 comprises a Direct Sensor array (DSA) 20 coupled to a Collection and a Data Organiser Unit (CONDOR) 10. The DSA comprises a High-speed Sensor Array (HSA) 22, a Low-speed Sensor Array (LSA) 24 and an Actuator Array (AA) 26. Optionally, the system may also comprise a Digital Acquisition and Control Unit (DA&C) 40 coupling an Indirect Sensor/Actuator Array (ISA) 30 to the CONDOR 10. On-line interfaces with the CONDOR may be provided through one or more of a Data Manager (DM) 60, a Distributed Control System (DCS) 50, and a Human Machine interface(HMI) 70. Such on-line interfacing may be built within the plant or it may be made manually and in absence of such interface, the CONDOR 10 would operate based on its established configuration. A Configuration Manager (CM) 80 may be used initially to specify sensors and actuators and to specify the monitoring, control, communications and diagnostic actions of the CONDOR 10.

All sensor and actuator arrays, DSA 20 and ISA 30, are coupled to the machinery being monitored and controlled.

The Direct Sensor Array (DSA) 20 includes all sensor signals that may be sampled either at a low data rate (such as process temperatures) or sampled at high data rates, for example at periods of less than 1 ms, due to the rapid variation of the signals (vibration signals). The indirect sensor array 30 is connected to a DA&C 40, which can only sample or provide outputs at low data rates. Examples where the high sampling speed is essential are dynamic pressure sensors, accelerometers (for vibration measurement), velocity type vibration sensors and electrical current sensors. The HSA 22 and LSA 24 provide digital or analog signals from sensors, which monitor a Driver and a Load of the machinery. For the case of an engine/compressor 2, examples of sensors to be included in the Direct Sensor Array 20 are listed in the following table.

| Direct Sensor Array (DSA) | | |
|---|---|---|
| # of Sensors | Sensor Class | Sensor Type |
| 20 | Accelerometer | Engine Cylinder Detonation |
| 2 | Accelerometer | Engine Vibrational Crank Case Position |
| 20 | Piezo or Optical | Diesel Engine Cylinder Fuel Pressure |
| 20 | Optical | Engine Cylinder Pressure |

| Direct Sensor Array (DSA) -continued | | |
|---|---|---|
| # of Sensors | Sensor Class | Sensor Type |
| 16 | Piezo or Optical | Compressor Cylinder Pressure |
| 8 | Accelerometer | Compressor Cylinder Distance Piece |
| 1 | Inductive | 1/Rev (Engine Speed or Flywheel) |
| 1 | Inductive | N/Rev |
| 12 | 0 to 100 mV | Thermocouples |
| 6 | 4–20 mA | Manifold and fuel pressure |
| 1 | 0 to 5 V | $O_2$ in exhaust gases |
| 1 | Hall effect | ½ Rev |

The HSA 22 and LSA 24 provide digital or analog signals from sensors, which monitor a Driver and a Load of the machinery.

The actuators, either comprised within the Actuator Array (AA) of the DSA 20 or in the Indirect Sensor/Actuator Array (ISA) 30, provide signals to control devices in response to electrical signals from a controller. Examples of control devices are devices controlling a mechanical position like a valve position, or devices controlling electrical contacts like relays, or any equivalents thereof In addition to actuators, the ISA 30 comprises other sensors that can be sampled at lower rates such as signals indicating state and process parameters, like the temperature, pressure etc., but they do not require a direct connection to the CONDOR 10. The use of a DA&C 40 depends on site details and user needs. The CONDOR 10 receives sensor values from sensor of the ISA 30 and control actuators within the ISA 30 through a DA&C 40.

The CONDOR 10 is responsible for one or more of the following functions:

a) performing sequential sampling of data from HSA 22 and LSA 24, b) generating outputs for actuator array AA, c) processing data samples (raw data) into calculated values corresponding to properties of the Driver and Load parts, d) storing calculated values and statistical information in a memory of CONDOR 10; The storing operation may be done periodically and the information may be stored for a predetermined period. For example calculated values are typically stored every hour, and kept in the memory for 30 days or more;

e) calculating control outputs from set-point input(s) and input(s) derived from a measured value. A common control algorithm is the proportional, integral and derivative (PID) function;

f) providing warning, alarm and shutdown conditions based on raw data calculations, normal operating limitations provided within the Driver/Load configuration. The warning conditions are stored in I/O registers that can be accessed by the HMI 70, DM 60 and DCS 50;

g) interpreting a user-defined sequence logic to automate a start-up/safety shutdown process.

The CONDOR 10 may have varying configurations depending on site requirements.

The DCS 50 is a control system, normally used for a large plant, which controls other systems within the plant. The DCS 50 is not essential for the external control of the IMCS system 1 and for smaller facilities its implementation is not advantageous. When the DCS 50 is present, it typically controls major items such as start, stop, revolutions per minute (RPM), while the IMCS system 1 controls local items causing the machinery to start in a desired manner, stop in a desired manner and operate to maintain a desired RPM.

The CM 80 defines sensor inputs for HSA 22 and LSA 24, actuator outputs for AA, communications links, memory organisation, sequencing logic and other parameters to enable the CONDOR 10 to perform its tasks.

The DM 60 performs at least one or more of the following:

a) uploads calculated and other values (historical or current data) from CONDOR 10;

b) uploads contiguous high-speed sensor data;

c) performs advanced analysis and post-processing of data.

The HMI 70 is an optional interface unit or computer for the site technician or machine operator which may perform at least one or more of the following:

a) access specified data registers in CONDOR 10, b) display CONDOR 10 information;

c) accept operator inputs to modify control actions of the CONDOR 10.

The DA&C 40 is an optional electronic unit (data acquisition and/or control) which may also provide data to the CONDOR 10 or be controlled by the CONDOR 10. A Programmable Logic Controller (PLC) may serve as a DA&C 40 for the CONDOR 10.

If present, the DM 60, CM 80 and DCS 50 have user interfaces.

Figure 3:
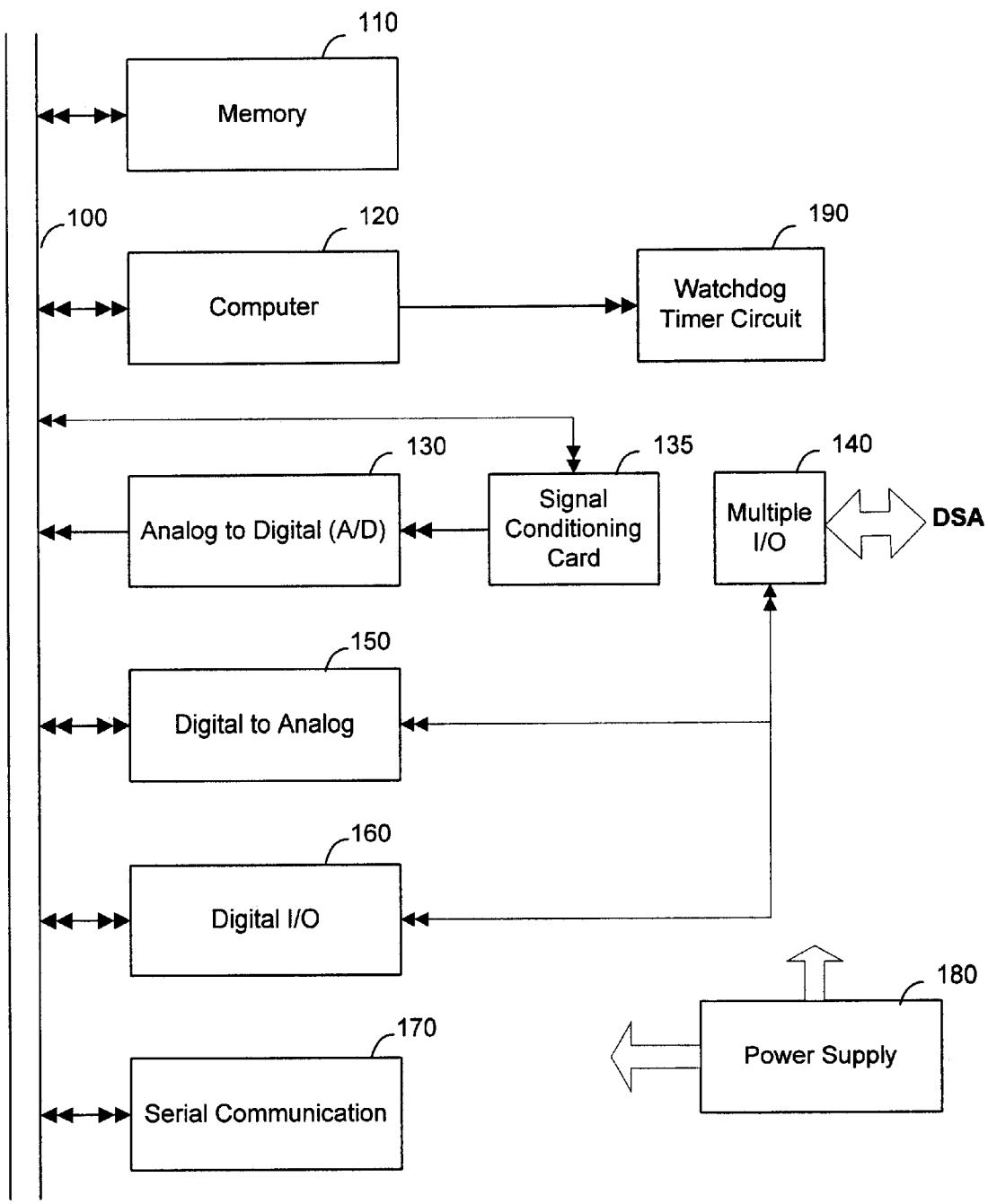
FIG. 3 is a block diagram of the hardware of a data collection and organizer unit (CONDOR) of the IMCS system in FIG. 2.

The general hardware organization of the CONDOR 10 is as shown in FIG. 3. FIG. 3 shows the basic components of the hardware tied together on a bus 100. Analog to digital (A/D) card 130 and Digital to Analog (D/A) card 150 are plugged into the bus 100 that is shared with the central processor or computer 120, which has a central-processing unit (CPU), as well as a Direct Memory Access (DMA) chip. The computer 120 has access to a memory block 110, comprising both volatile and non-volatile memory. Input and output ports are represented on the diagram by a multiple input/output block (I/O) 140 which couples the sensor and actuator-arrays to the rest of the CONDOR 10. The multiple inputs and outputs (I/O) 140 may be multiplexed and conditioned using electronic circuits conventional in the art. Generally, a signal conditioning card 135 conditions the analog signals from the sensors before sending them to the A/D card 130. A digital I/O card 160 is also linked to the central bus 100, in the preferred embodiment. A serial communication unit 170 is tied on the bus 100 for allowing communication among devices. The serial communication unit 170 may comprise conventional hardware, complying with standards such as RS232, RS485, Ethernet, Canbus, Fieldbus, Arcnet and others. A modem may be included either connected to the bus 100 or connected to a serial communication unit (SCC) 135. A power supply 180 to provide the necessary power for the operation of the CONDOR 10 is present. Power requirements criteria would be obvious to a person skilled in the art and they will not be described here. An external watchdog timer circuit 190 is connected to the computer and will de-energize a relay if it does not receive a trigger pulse from the computer within a defined time period. The watchdog timer 190 thus verifies the operation of the system software.

The CONDOR 10 is responsible for data sampling, A/D & D/A conversion, multiplex control, data collection, data & communication conversion and operational control. The CONDOR 10 hardware sequentially monitors the Direct Sensor Array 20 based upon software criteria and, possibly, a Driver/Load shaft rotation marker signal, as it will be described later on. Provisions can be made such that cycling of power will return the CONDOR 10 unit to a data acquisition state and resume data collection (i.e., Cold Start). The CONDOR 10 hardware of the preferred embodiment has a well developed real-time operating system (RTOS) such as QNX, I/O Device Drivers for RTOS and Basic Input Output System (BIOS) capability for cold start of the CONDOR 10 software.

Memory 110 is upwards expandable dependent on installation requirements. The CONDOR 10 has sufficient Non-Volatile (NV) storage memory to support the RTOS SW, CONDOR 10 software and Configuration information. The CONDOR 10 also has sufficient RAM to store a set of sensor data and the calculated values for a 1 hour period of time (or any other predetermined period of time). Furthermore, the CONDOR 10 has sufficient NV memory to store 30 days (or any other predetermined period of time) of summary calculated data. The DM 60 has sufficient hard-disk to store an appreciable amount of CONDOR 10 uploaded data summaries.

The signal conditioning card (SCC) 135 acquires/conditions the sensor signals. Each sensor line has protection and associated input buffering and/or amplification, as required. Data lines are be grouped into sensor sets according to sensor class (i.e., Vibrational, Cylinder pressure) and signal type (i.e., Engine Cylinder Detonation). In this way, a sensor set can utilize the same conditioning module. The signal conditioning card (SCC) 135 comprises one or more conventional conditioning modules and a multiplexer. The number of sensor sets determines the number of conditioning modules, which, in turn, specifies the number of the signal conditioning card analog outputs. The multiplexer on the SCC 135 then selects the appropriate sensor signal/conditioning module pair to be used during data acquisition. A conditioning module may provide translation/gain, isolation barrier, filtering and any other safety or signal manipulation that may be required. Test points can be incorporated into the HW design such that sensor signals can be monitored at critical stages (i.e., after input protection, before/after signal conditioning). These test points may be accessed only if the circuit board assembly is exposed.

The A/D card 130 converts the conditioned analog signals to digital and buffer the sampled signal values. When the microcontroller is ready, the buffered samples are transferred to RAM. The A/D should preferably be selected for a reasonable number of input channels such that a pre-multiplexing of conditioning card output signals is not required. For example, A/D may be 8 or 16 channels with an onboard multiplexer. An embodiment in which several A/D cards 130 operate at the same time to achieve both sequential and simultaneous data acquisition is contemplated. For example, if 4 A/D cards 130 operate in conjunction with the LSA 24 and the HSA 22 at the same time, several channels can be acquired simultaneously from these arrays.

The D/A card 150 converts generated digital control signals to analog control signals, which are to be fed to the actuators.

The SCC 135, the A/D cards 130 and the D/A cards 150 are collectively referred herein as signal conversion means. It will be understood by a person skilled in the art that the signal conversion means may comprise alternative hardware elements achieving equivalent functions, as well as other components that act upon the input or output signals.

Provisions can be made to have Digital I/O capabilities 160 for the following signals: Input: Remote/Local and Output: Warning On/Warning OF or others. A Remote/Local toggle may originate, for example, from a hard switch mounted on a user interface connected to CONDOR 10.

Referring back to FIG. 2, existent DA&Cs 40, if any, have suitable analog and digital I/O for sensor sampling and CONDOR communication. In addition, existent DA&Cs 40 may have sufficient processing power to be a controller for Driver/Load parameters.

Figure 4:
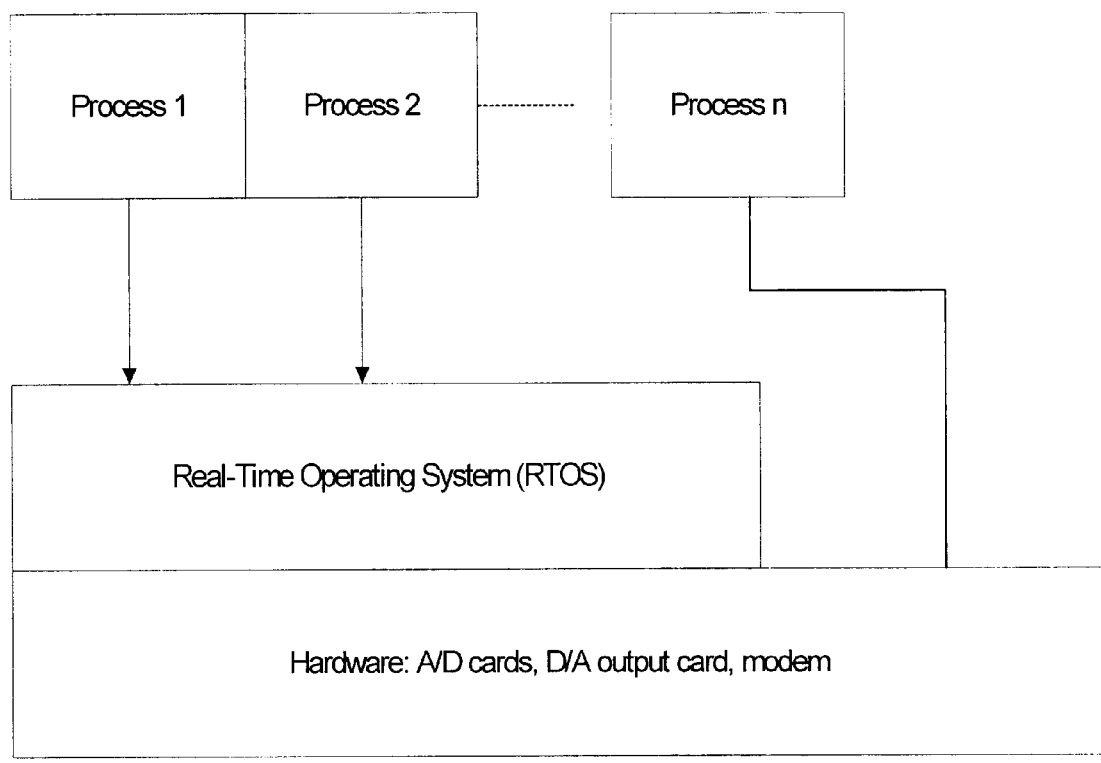
FIG. 4 is a diagram of the software architecture of the CONDOR unit in FIG. 2.

FIG. 4 illustrates generally the software architecture of the IMCS system 1. The IMCS system 1 software is built on the top of a real-time operation system (RTOS), preferably POSIX 1.004 compliant, such as QNX. Some processes may communicate with the hardware directly, as needed.

Figure 5:
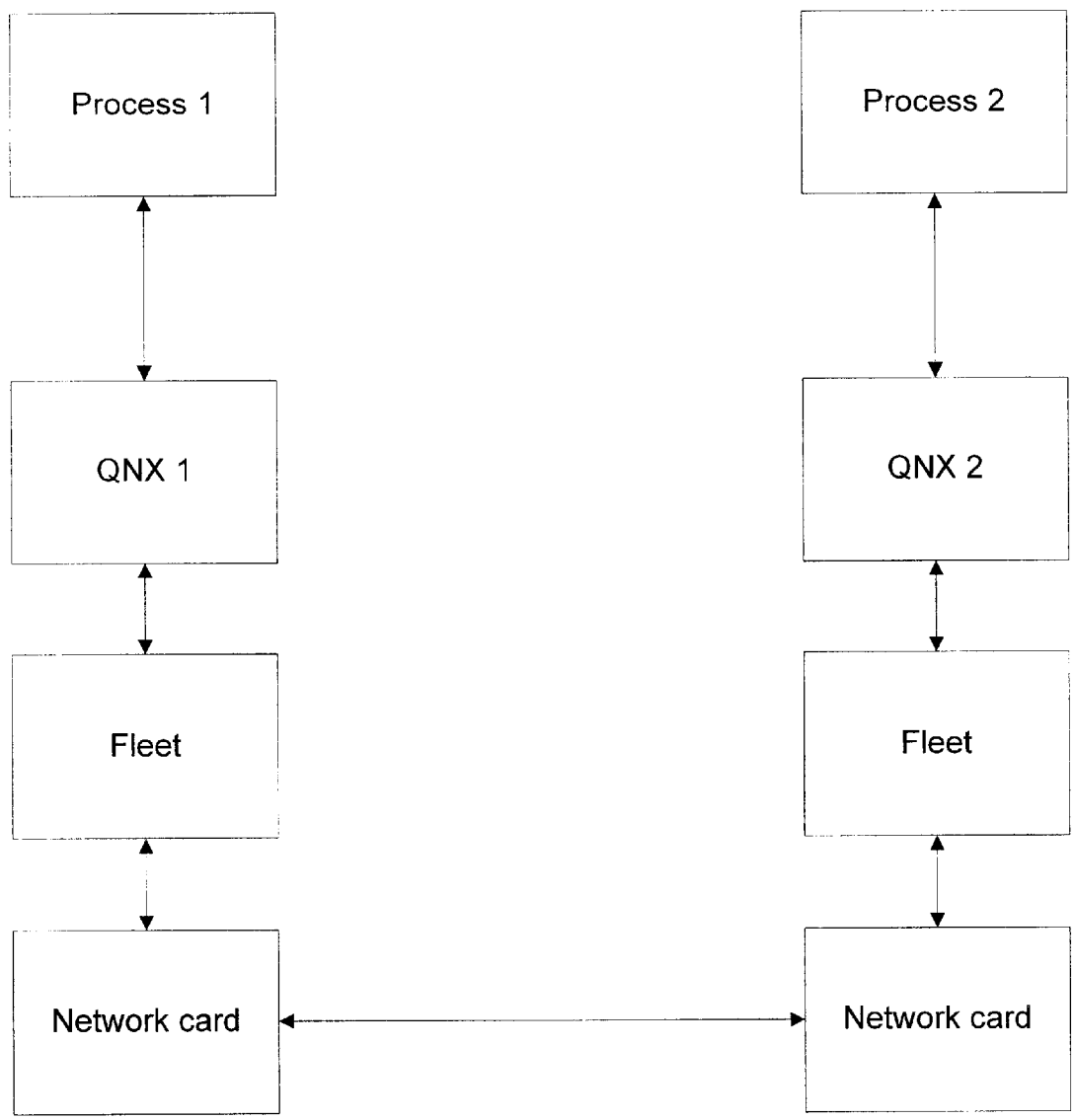
FIG. 5 is an example diagram showing the transparency of the network incorporating the IMCS system of the preferred embodiment to software processes and the ability of processes running in the IMCS system to communicate among each other and/or with processes on other systems connected in a network with the IMCS system.

In the preferred embodiment, the processes are built using a standard interprocess communication protocol (IPC) such as QNX IPC (message passing). This allows processes running on different units connected by a network to communicate among each other, as shown in FIG. 5. Also, the network is totally transparent from the software processes. This is accomplished by special low-level protocols of the RTOS, such as "fleet" in QNX. This feature makes the system software very easy to expand without rewriting any code.

Figure 6:
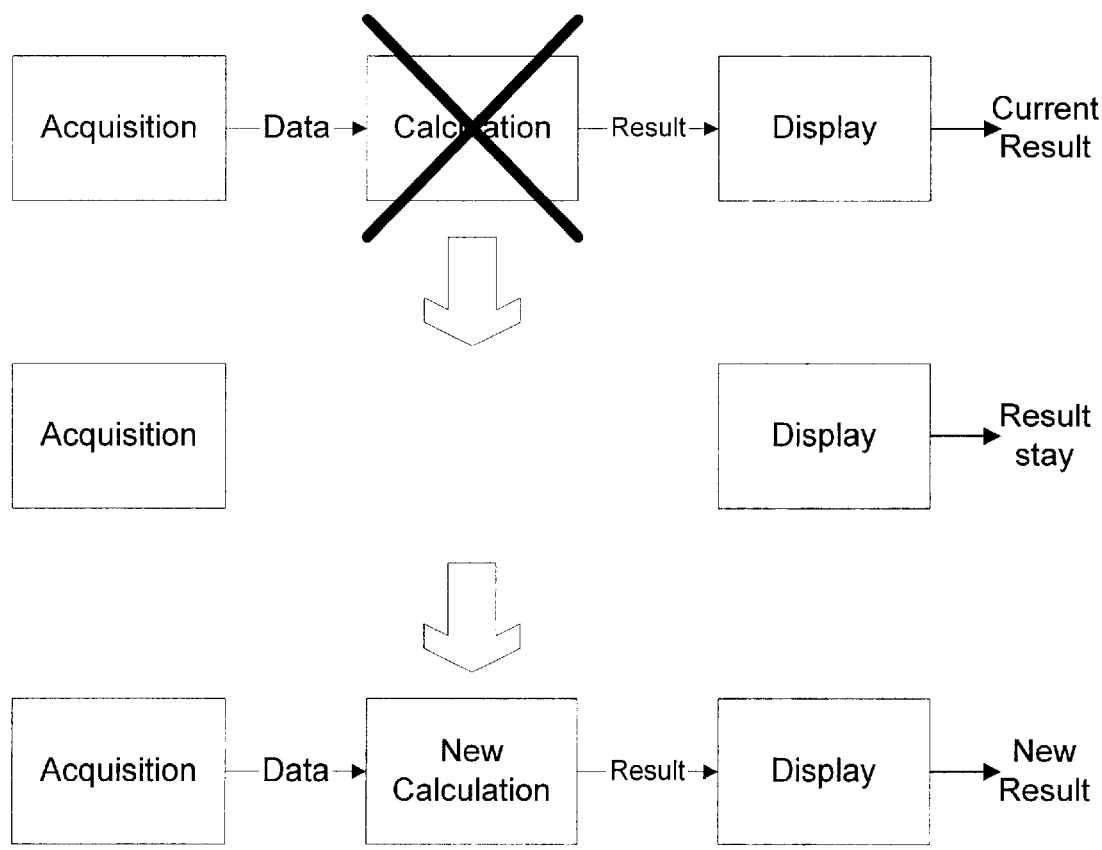
FIG. 6 is a diagram showing an example in which a calculation block within the software of the CONDOR unit of FIG. 2, is updated on-line.

In the preferred embodiment, the IMCS system 1 software is built so that any process can be updated on-line. FIG. 6 illustrates this feature, by way of example: suppose one of the calculations is wrong. The developer fixes the corresponding process and uploads it to the system. Then the new process can be restarted without resetting the whole system.

Since some of the processes can be updated on-line, the calculation can be customized for different applications. The preferred embodiment includes one or more of the following calculations: peak value, indicated power, efficiency, rod load, flow, valve loss, signal smoothing, vibration statistics and others.

Referring back to FIG. 2, the operating system and communication standards of the preferred embodiment are described next. The DM 60 may operate on a 32 bit platform such as Win 95, Win NT. The CONDOR 10 may operate on a QNX RTOS platform. The Digital Control System (DCS) 50 communicates with the CONDOR 10 using a communication protocol such as Modbus. The CONDOR 10 will respond to queries from the DCS 50 providing information and control as required. Remote queries will be run in the background during normal operation. The DM 60 communicates with the CONDOR 10 using a communication protocol such as TCP/IP using a RS232, Ethernet/10BT, or modem/RJ11 connection. Preferably, the communication protocol between the DM 60 and the CONDOR 10 adheres to a standard such as TCP/IP. The DM 60 sends and retrieves configuration files to and from the CONDOR 10. In addition, the DM 60 retrieves either historical or current calculated data from the CONDOR 10. Remote queries will also be run in the background so as not to disturb normal operational functions. The CONDOR 10 has the capability to communicate with at least 1 external Data Acquisition and Control Units (DA&C) 40 using a communication protocol such as second Modbus or TCP/IP connection. The CONDOR 10 acquires Indirect sensor data from a DA&C 40 and sends output or set point values to a DA&C 40 for control of actuator(s). The DA&C 40 may be in the form of an Engine Controller. The CONDOR 10 provides display information to a set of I/O registers, which are to be accessed through the HMI 70. The CONDOR 10 and the HMI 70 may communicate via a third ModBus connection. The CONDOR 10 may have provisions for a modem connection. In this way, a DM 60 can remotely connect to a CONDOR 10 and be provided with I/O capability 3. The HMI 70 obtains information from a specified set of CONDOR 10 registers and presents this information to the user. The user will be able to alter CONDOR 10 set point values and configuration limits via the HMI 70. If there is no HMI 70 present, then the site DCS 50 will provide the user with I/O capability 3.

Fail safe features of the preferred embodiment of the invention are next described, with reference to FIG. 2. A power passive protocol is implemented in the CONDOR 10. Specifically, all I/O ports remain dormant until the CONDOR 10 system has initialized itself and is ready to enter normal operating mode. The CONDOR 10 self starts its RTOS and executes the CONDOR SW. The CONDOR SW initializes/checks communication with all Modbus devices. All inputs may remain active during CONDOR 10 self start, but data will not be recognized until sensor power has been reinstated. If necessary, the CONDOR 10 may control sensors' ramp to their normal operating conditions. The CONDOR 10 waits until sensors have stabilized to provide valid data samples. If necessary, the CONDOR 10 undergoes a test sequence to determine data availability. All control lines are held in a closed state, i.e. assert power-on state, until required otherwise. Output lines are held in a closed state until required otherwise. All output relay lines are energized after the CONDOR 10 has reached a stable state.

The CONDOR 10 operates on a time window storage scheme. Therefore, once data for a time window has been collected, it will be summarized and stored to NV memory. Prior to storing the current dataset, the CONDOR 10 checks to see if the last data set was stored completely. In either case, the current data set is stored following the last complete data set. Preferably, a new file containing the current dataset is generated rather than appending the current dataset to a file containing the last complete dataset, so that the old dataset can never get corrupt. Also held in NV memory is the RTOS, CONDOR 10 SW and configuration information. Thus, a power failure only loses the current time window of data. Summary data of all previously sampled time windows would have already been stored to NV memory and will not be lost. Similarly, the CONDOR SW and configuration information reside in NV memory and are be available upon reinstatement of power to the unit. The shut-down (SD) software updates the CONDOR's watchdog timer 190; if the timer 190 is not updated within a preset time (e.g loss of power to the CONDOR or processor failure), an external relay will be de-energized. This normally causes an emergency shut-down.

The following table shows possible types of hardware communications failures that may take place within the IMCS system 10 of FIG. 2.

| Failure | Solution |
| --- | --- |
| DCS Communication Failure | SW Watchdog timer |
| DAU Communication Failure | Detected by CONDOR |
| Ignition Communication Failure | Detected by CONDOR |
| Direct Sensor Failure | Detected by CONDOR |
| Air/Fuel Control Failure | Detected by CONDOR |
| Internal CONDOR Failure | External Watchdog circuit |

In the preferred embodiment, the CONDOR 10 detects most of the communication errors automatically. When an internal error occurs, the CONDOR 10 itself will not be able to recover and will not generate the signal expected by the external watchdog circuit 190. The external watchdog circuit 190 will de-energize a relay, which will cause an external alarm or machine shutdown. The CONDOR 10 also has a software watchdog timer. The DCS 50 has to trigger the predefined CONDOR coil within a given interval. If the DCS 50 this does not occur, the communication failure alarm for DCS 50 will turn on.

All the communication alarms can be accessed through the sequencing logic. The CONDOR 10 can be programmed such that it will perform different actions on different communication failures. If the communication to the DCS 50 fails, the CONDOR 10 can use the last received set point values and continue to run as before, or it can go to the local control. If the communication with a DA&C unit 40 or direct sensors is not healthy, then, based on how critical the data is, the CONDOR 10 can choose either ignore the failure, generate an alarm or cause a machine shutdown.

The sensor data processing, as it occurs in the preferred embodiment of the invention is next described. Specifically, data algorithms required for data acquisition, calculation, reduction, compression, and storage are described.

As previously mentioned, data acquisition occurs by two methods: Direct and Indirect. Direct data acquisition has the sensor data lines being input directly to the CONDOR 10, through the DSA 20. The CONDOR 10 provides the necessary multiplexing, signal conditioning, A/D conversion, and signal filtering of the sensor signals such that useful data can be obtained. During Direct data acquisition the sensors are sequentially sampled (i.e., one sensor will be sampled at a time). The DM configuration software obtains sampling information from the user which will specify parameters such as channel type, sensor type, filter choice, sample rate, sensitivity, location, etc. In addition, the configuration software may provide a user with the option of altering the sensor sampling sequence should the order of data acquisition be important.

Figure 7:
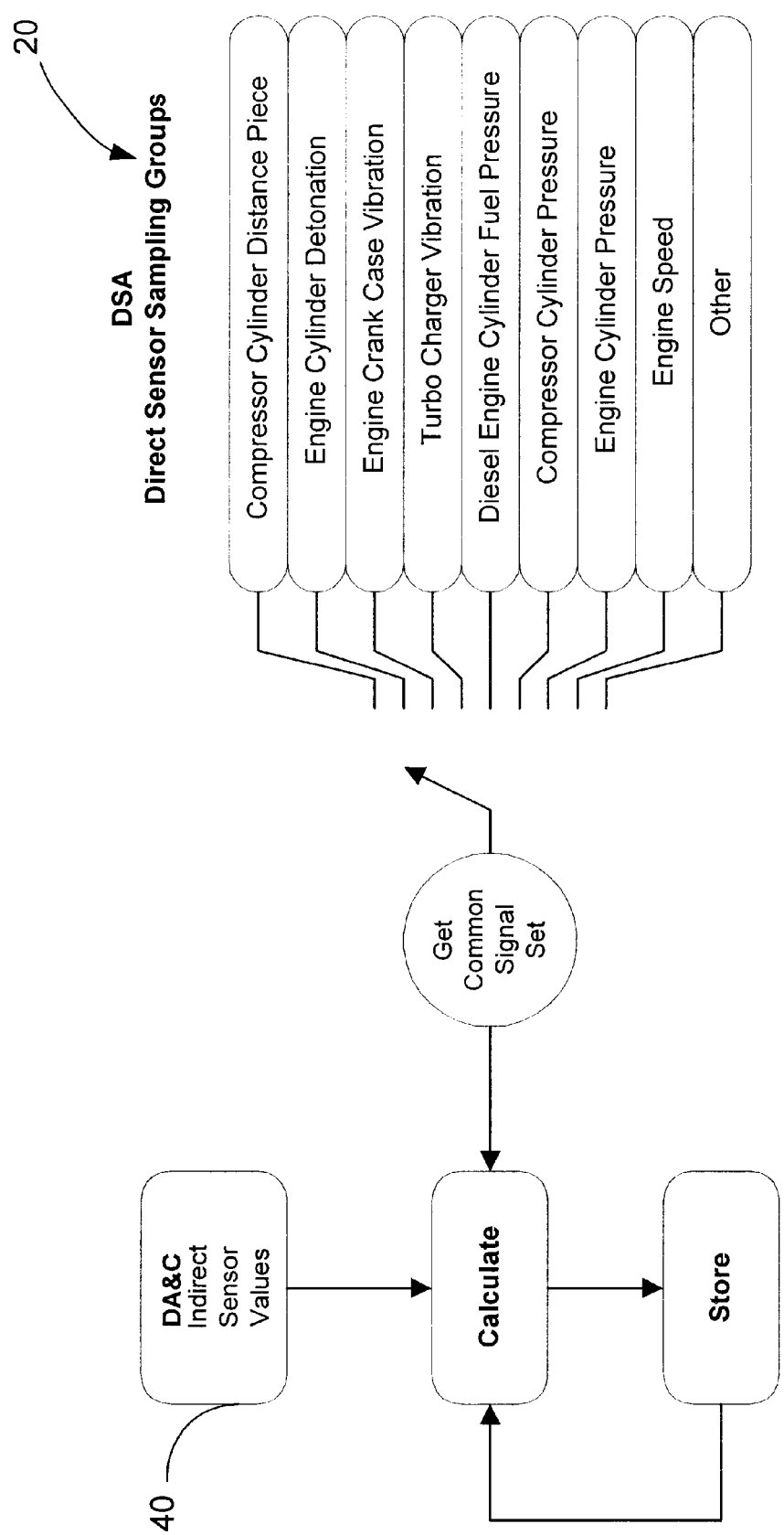
FIG. 7 is a diagram describing the data acquisition process performed by the IMCS system, according to one embodiment of the invention.

The Indirect Sensor Array (ISA) 30 is sampled by one or more DA&Cs 40. The CONDOR 10 queries the DA&Cs' 40 Modbus for Indirect sensor data. FIG. 7 illustrates a scenario in which the gathering of Direct and Indirect data is interleaved. The CONDOR 10 acquires subsets of Indirect data through multiple polls of a DA&C 40. The Direct data is acquired sequentially sensor by sensor, storing the information into RAM. Not all sensor data is acquired at once. The contiguous data acquired from the HSA 22 is acquired at the same time as data from the LSA 24 and the indirect sensors via the DA&C 40.

Data filtering techniques may be implemented upon raw sensor data to maximize the signal to noise ratio (SNR). Further filtering may be used to remove excess data and focus on regions of interest, thereby reducing the complexity of characteristic value calculations.

Figure 8:
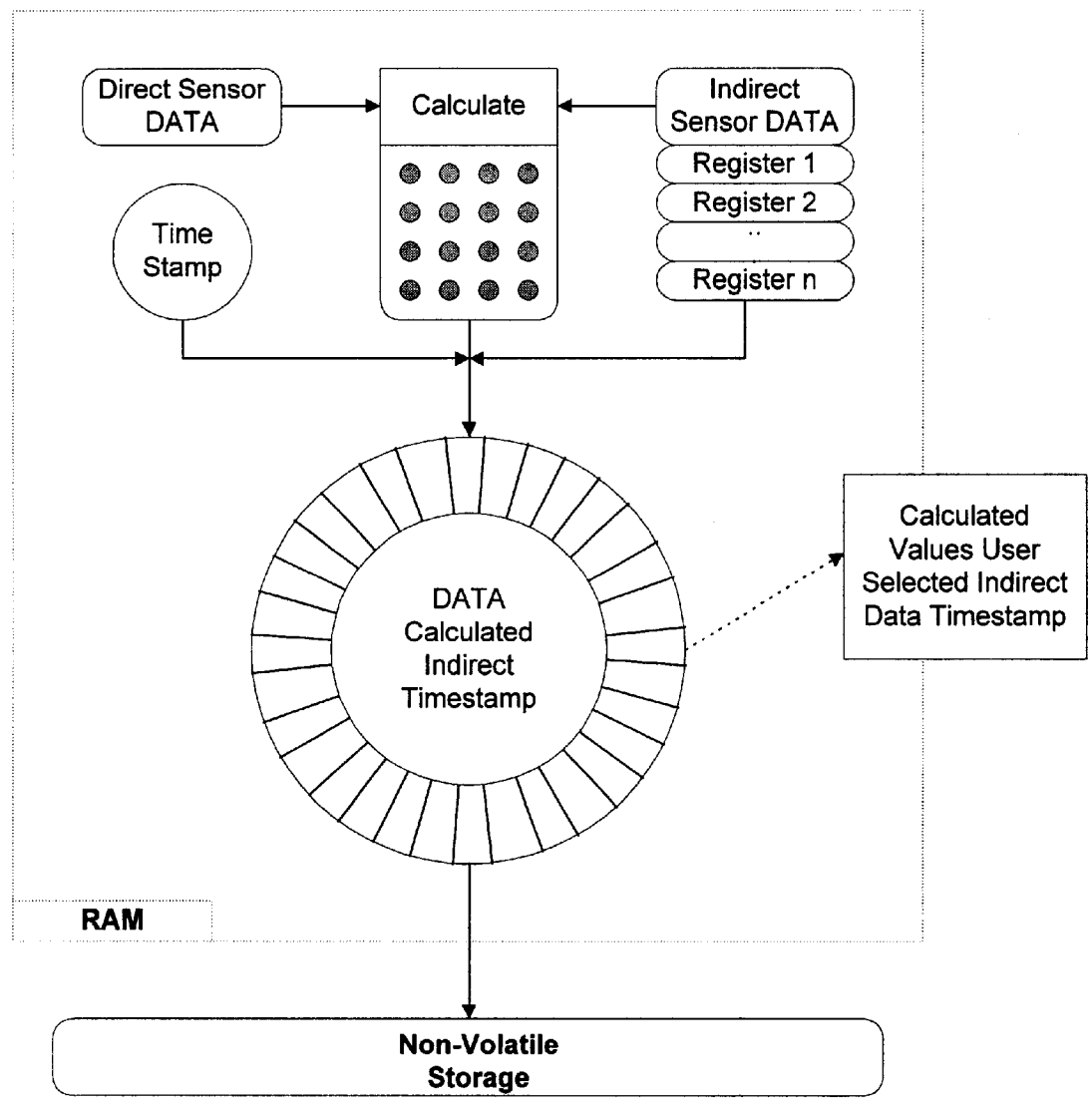
FIG. 8 is a diagram describing the data collection and storage process, within the CONDOR unit of FIG. 2.

FIG. 8 illustrates a data collection, calculation and storage process technique implemented in the preferred embodiment of the invention. For an engine or a compressor, pressure sensors generally require at least 720 samples/rev to perform power calculations and vibrational sensors should preferably acquire data at their maximum sampling rate. A current embodiment of the invention achieves the maximum sampling rate of 25000 samples/sec. For vibrational and pressure Direct sensors, an initial calculation for a desired parameter is performed after each sampling period. For the case when the resultant parameters are the only numbers of importance, the data buffer is free to be overwritten by the next acquired sensor sample set. Final calculations are performed after all relevant sensors have been polled and interim parameters calculated. These final calculations are tabulated, time stamped and posted to output registers. In this way, final calculated values are made available to the HMI 70 display. The tabulated data has an associated Avg/Max/Min/St. Dev. appropriate to the characteristic calculation. Only these summary values will be forwarded to the software for storage.

Figure 9:
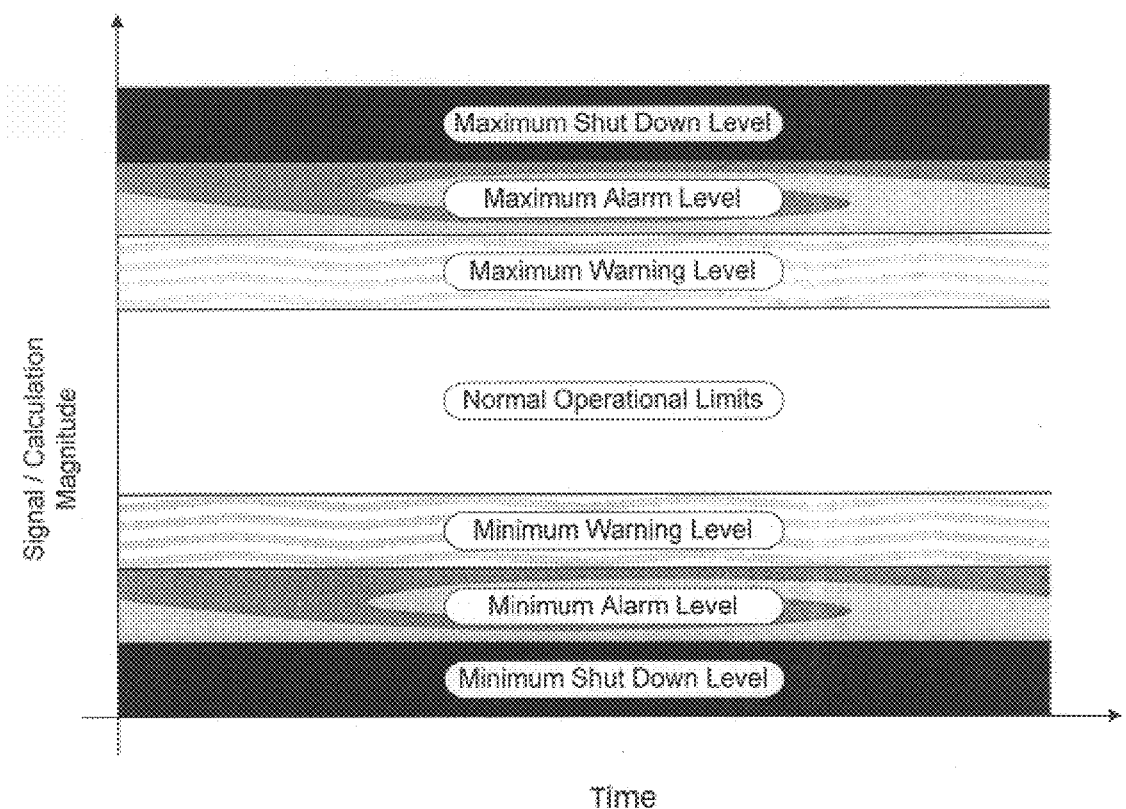
FIG. 9 is an example of data evaluation conditions imposed within the IMCS system, in one embodiment of the invention.

FIG. 9 illustrates data evaluation conditions in the preferred embodiment of the invention. Data and/or calculated values have a user configurable warning message alert/no alert for the user configurable max/min warning boundary conditions. If the values do not fall within the normal operational range then a warning message may be issued to all devices connected to the system. Furthermore, data and/or calculated values have user configurable alarm max/min boundary conditions. If the values exceed the alarm level, messages are issued to devices indicating that the system has not been able to correct the warning and that an alarm condition has developed. Moreover, data and/or calculated values have user configurable shut-down max/min boundary conditions. If the values exceed the shut-down level, messages are issued to devices indicating that the system has not been able to correct the alarm and that a shut-down condition has developed. The CONDOR 10 can either generate a shut down digital output signal or set the Watchdog signal to indicate such a condition.

Figure 10:
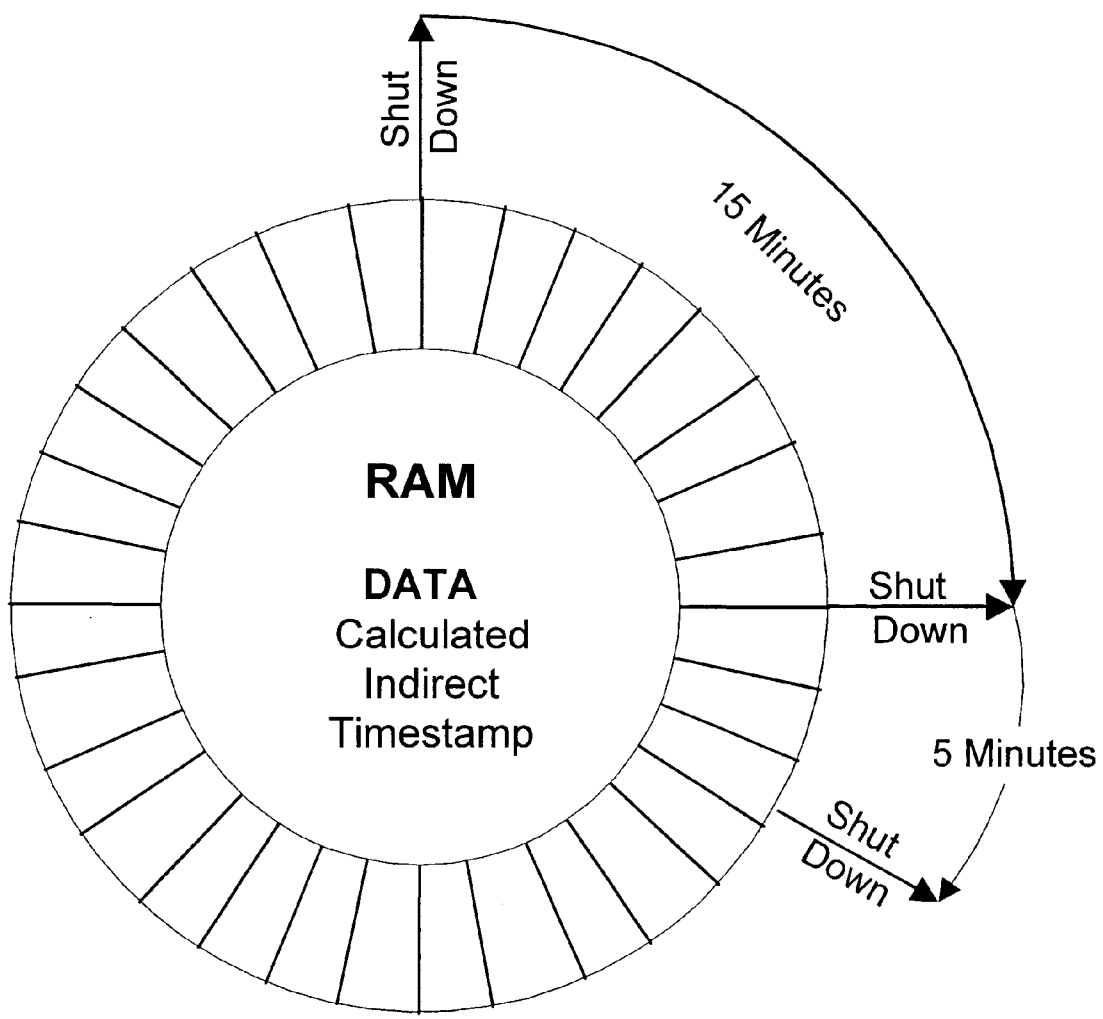
FIG. 10 is a diagram depicting the data storage process in a Normal Mode of operation of the CONDOR unit in FIG. 2.
Figure 11:
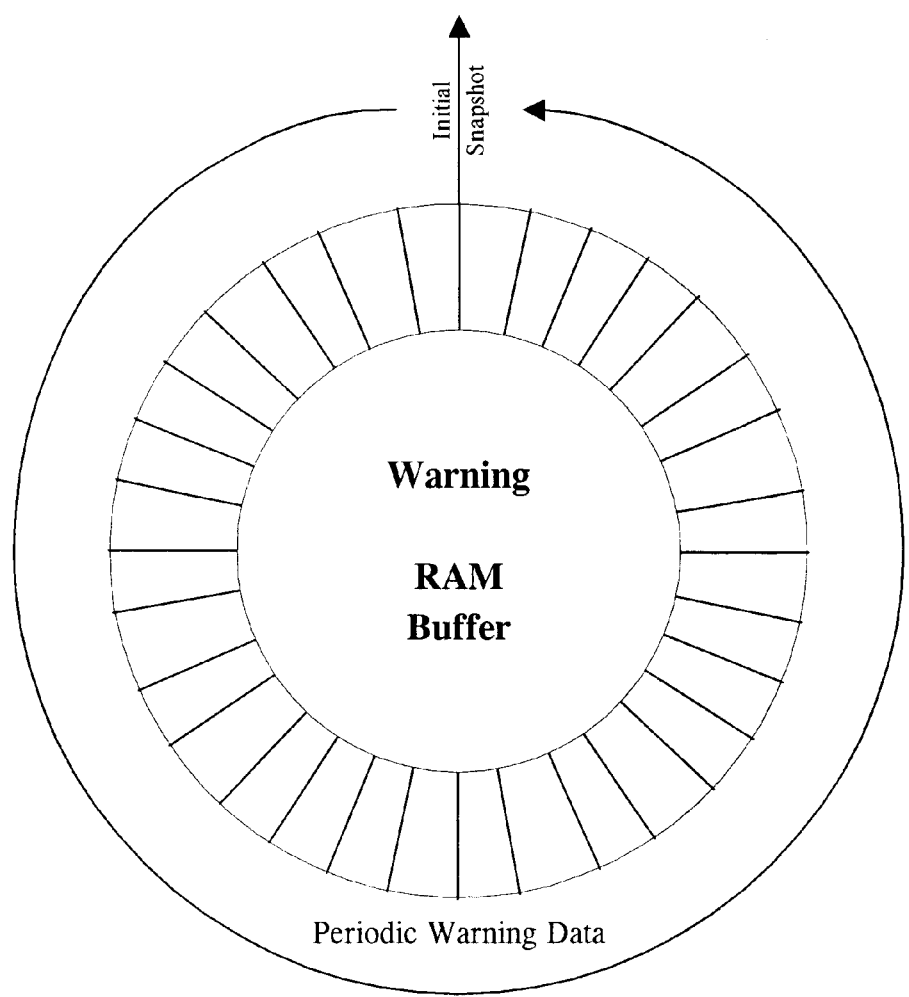
FIG. 11 is a diagram depicting the data storage process in a Warning Mode of operation of the CONDOR unit in FIG. 2.
Figure 11:
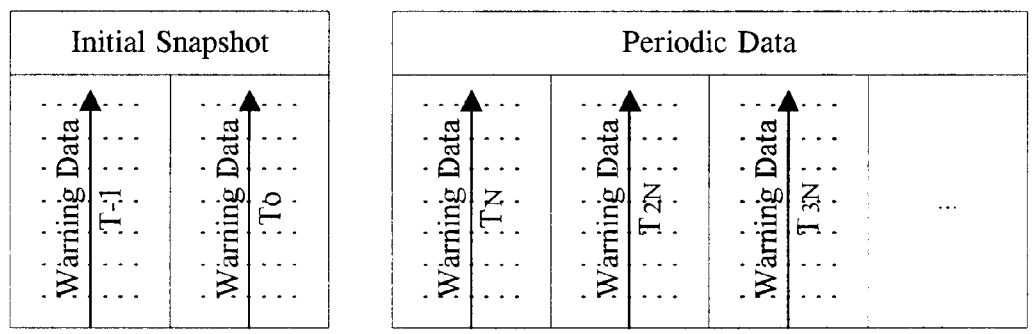

In the preferred embodiment of the invention, data storage occurs in two modes of operation: Normal and Warning. Both of these modes of operation have RAM and NV storage requirements. FIG. 10 illustrates the Normal Mode operation. For the engine/compressor 2 case, Normal Mode is defined to be the state of data acquisition where the engine speed$\geq$crank speed. The CONDOR 10 only acquires data and stores the summary information to RAM if Normal engine speed level is achieved. Data to be stored in Normal Mode only includes user defined Indirect and Calculated values with associated time stamps, as opposed to Warning Mode in which all Indirect and Calculated values are stored. If a SD/restart is encountered prior to 1 hour (or any other predetermined time period) of continuous runtime being achieved, the CONDOR 10 appends the current data to the previously acquired data noting when the SD occurred. FIG. 11 illustrates the Warning Mode operation. The Warning Mode is defined to be the state of operation in which a user defined data and/or calculated value has exceeded the max/min warning limits. Data stored in Warning Mode includes all Indirect and Calculated values with associated time stamps. The CONDOR has an additional warning buffer which contains 2 complete sets of values. When a warning is encountered a "snap-shot" of the data set is stored in RAM containing the warning message number, the warning value, the warning limit and the previous data set. A single data set is then periodically acquired until the warning is cleared. If the warning is cleared before the warning memory is filled, then only the "snap-shot" is stored to NV memory. Otherwise, both the "snap-shot" and the periodic samples are stored to NV memory. The CONDOR 10 continues to store periodic samples until the warning is cleared. If the NV memory becomes full, then data is overwritten. Warning data may always be uploaded, however, to clear the warning NV memory the user may set a password protected flag to assist in data management. If the warning becomes an alarm, then the CONDOR 10 continues to store data in this mode. If the alarm becomes a shut-down, then the CONDOR 10 stores all collected information to NV memory and awaits for engine restart.

Figure 12A:
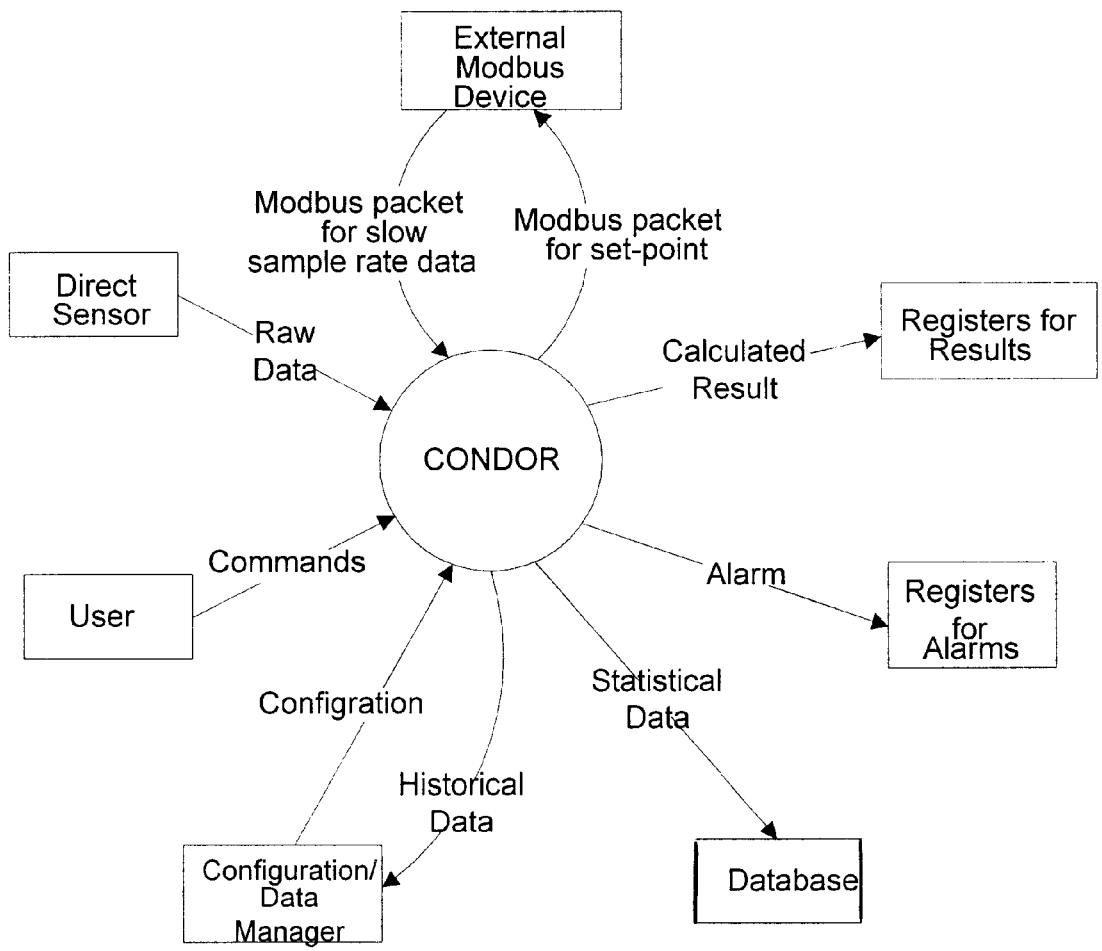
FIGS. 12A–12G are level-0, level-1 and level-2 data flow diagrams for the monitoring and diagnostics processes performed by the IMCS system of the preferred embodiment of the invention, when used in conjunction with an engine or compressor.
Figure 12B:
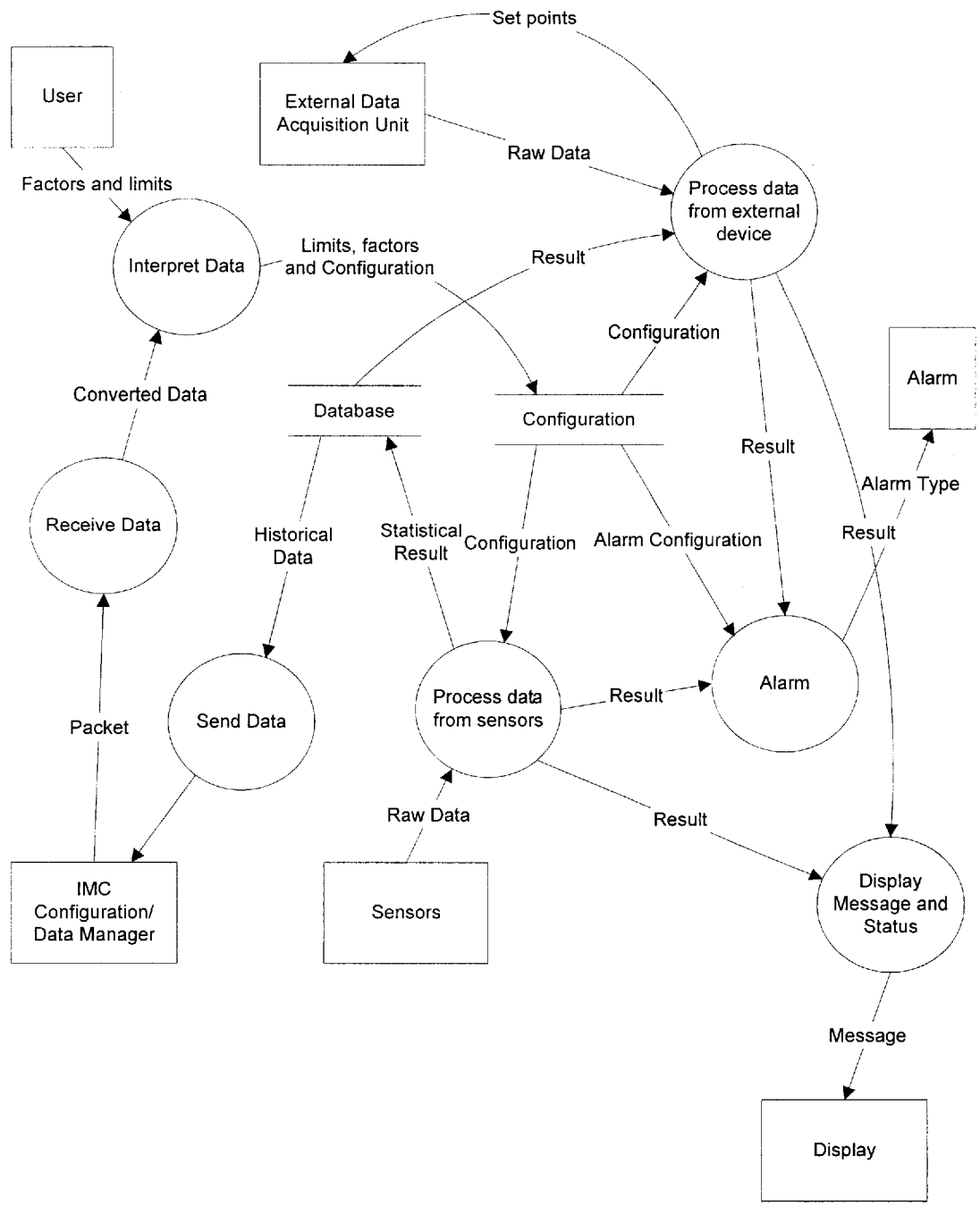
Figure 12C:
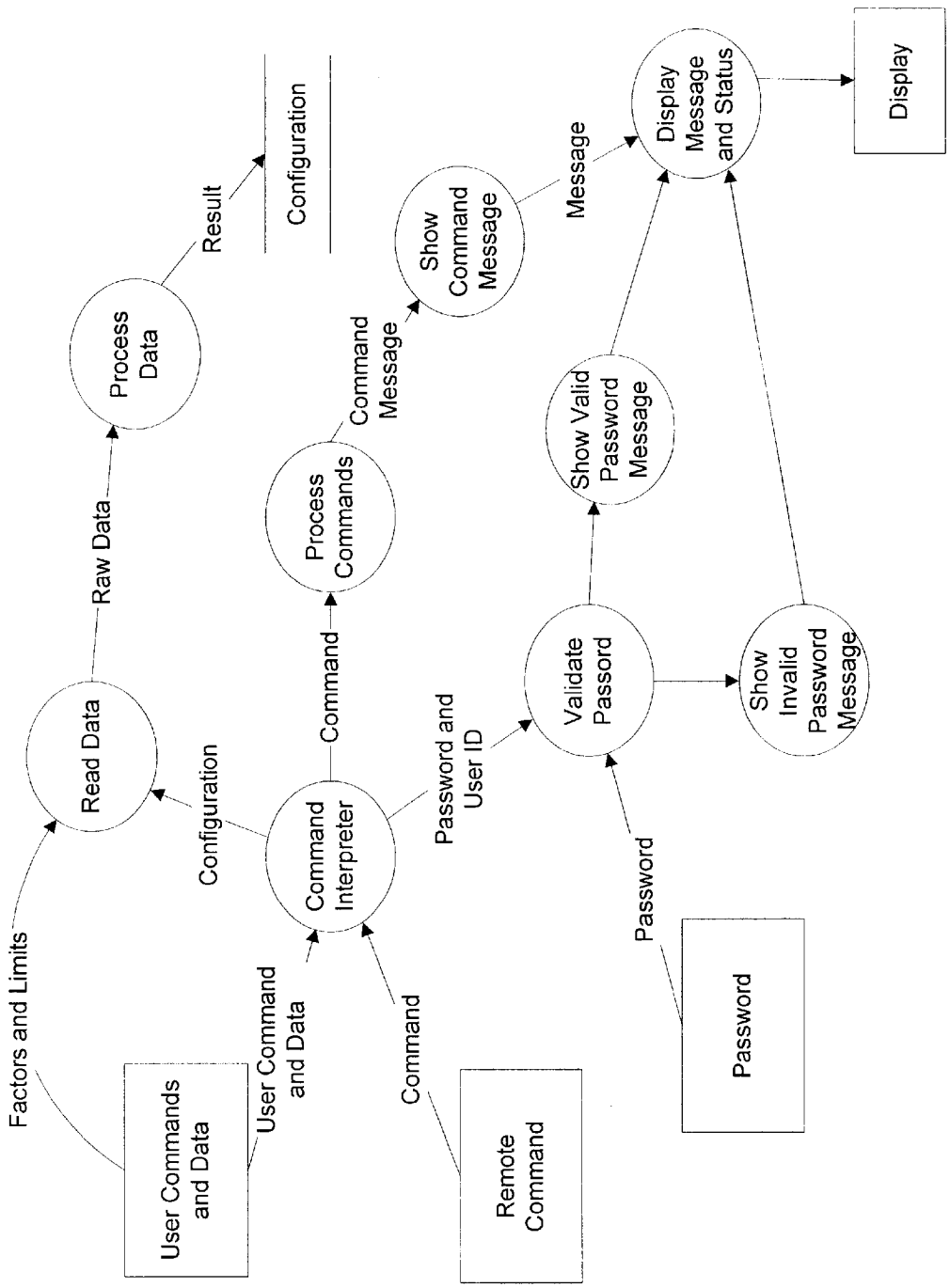
Figure 12D:
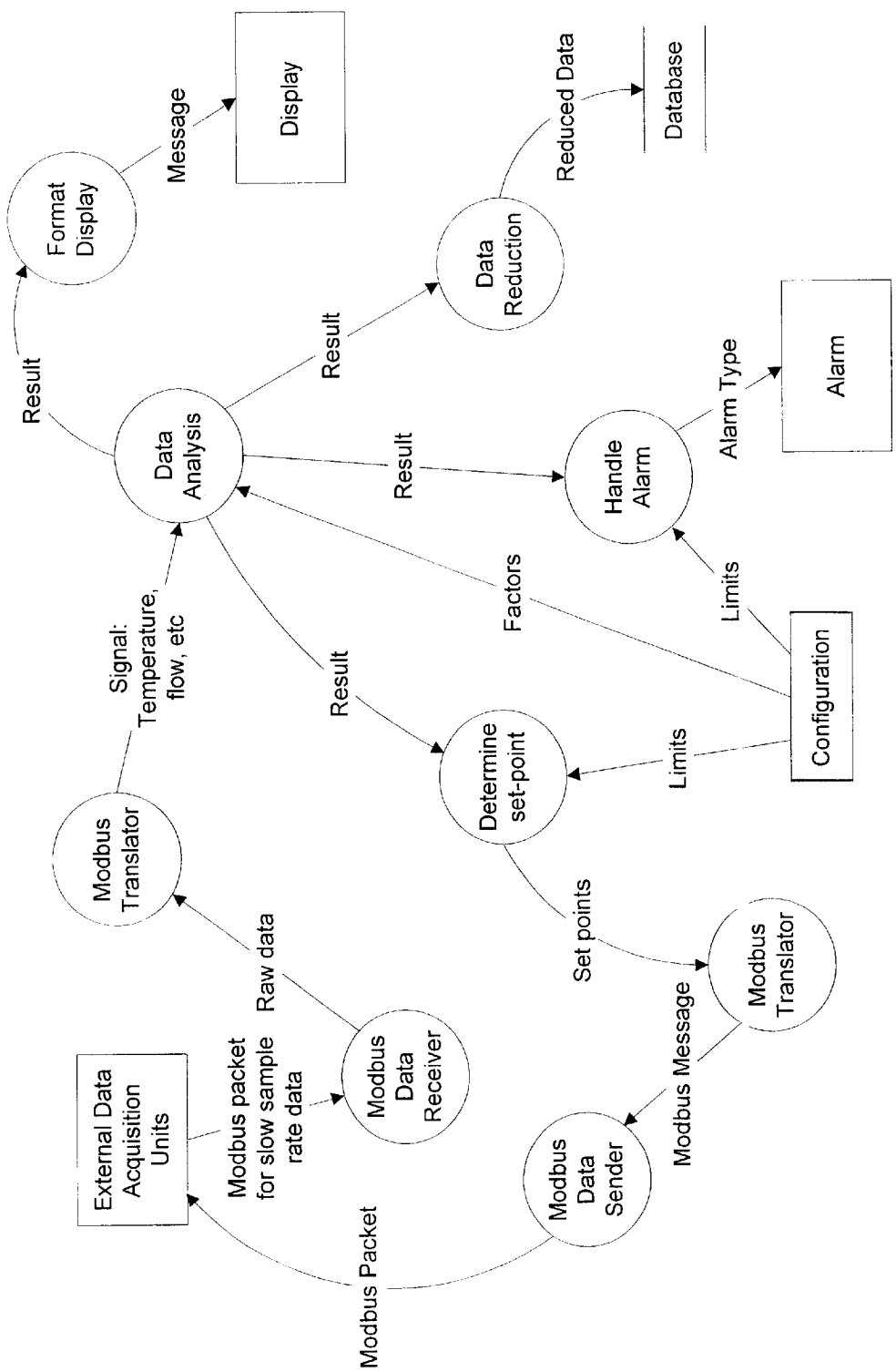
Figure 12E:
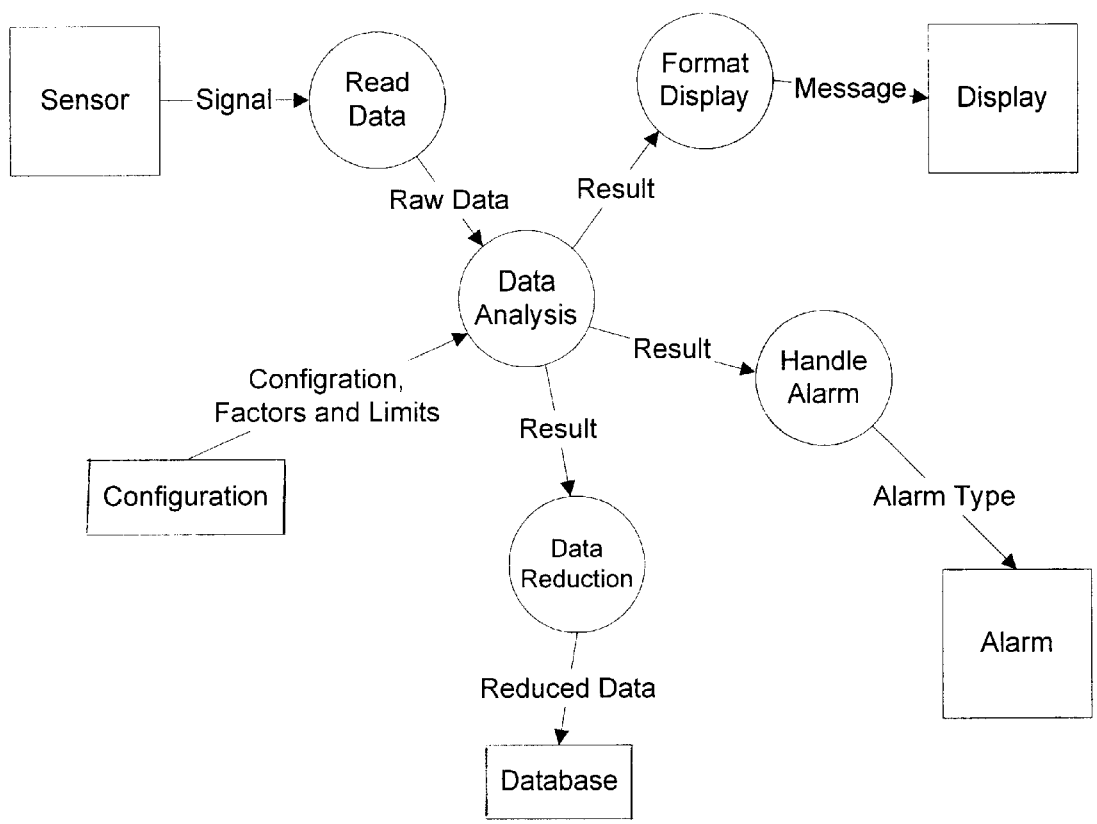
Figure 12F:
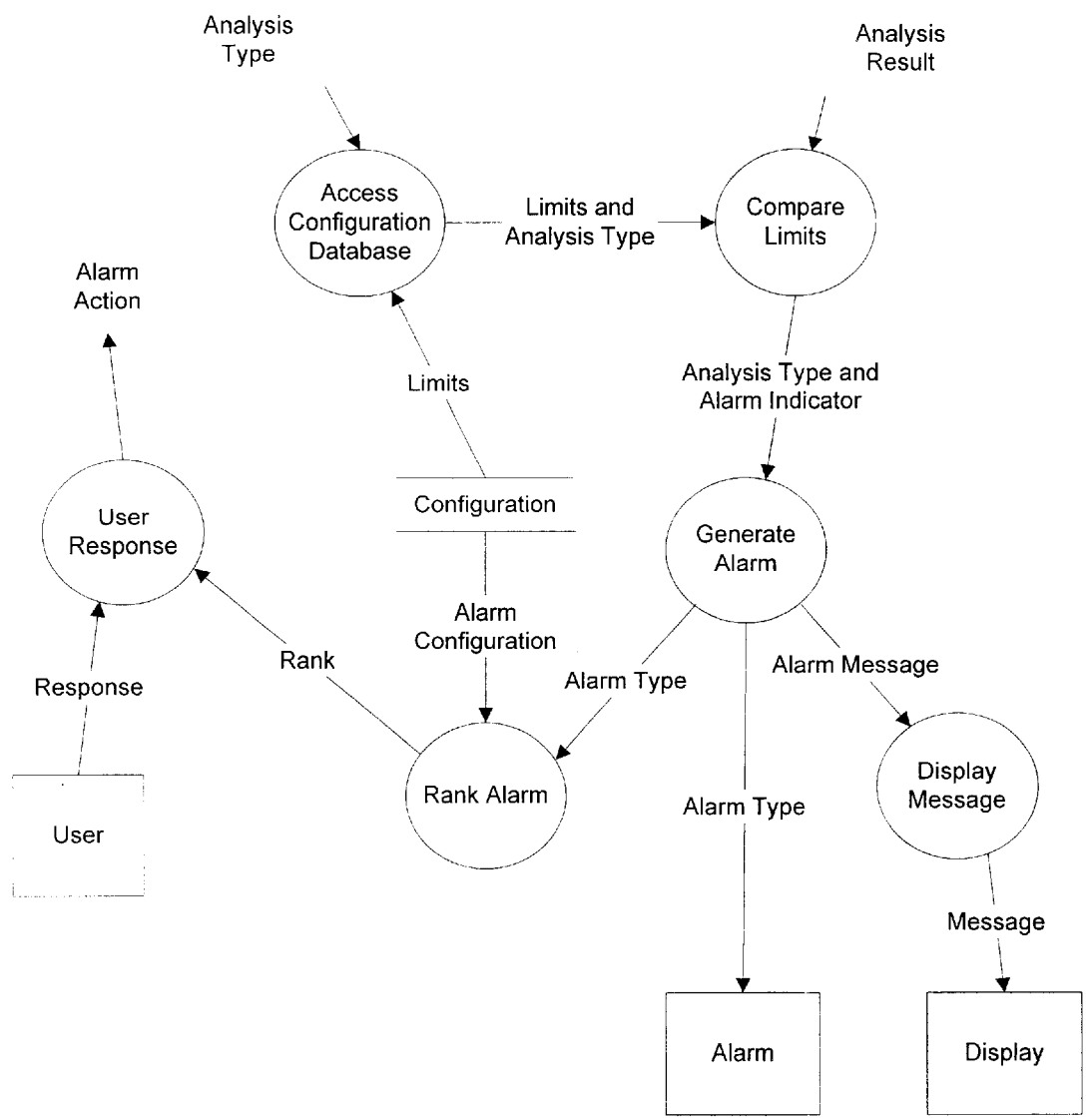
Figure 12G:
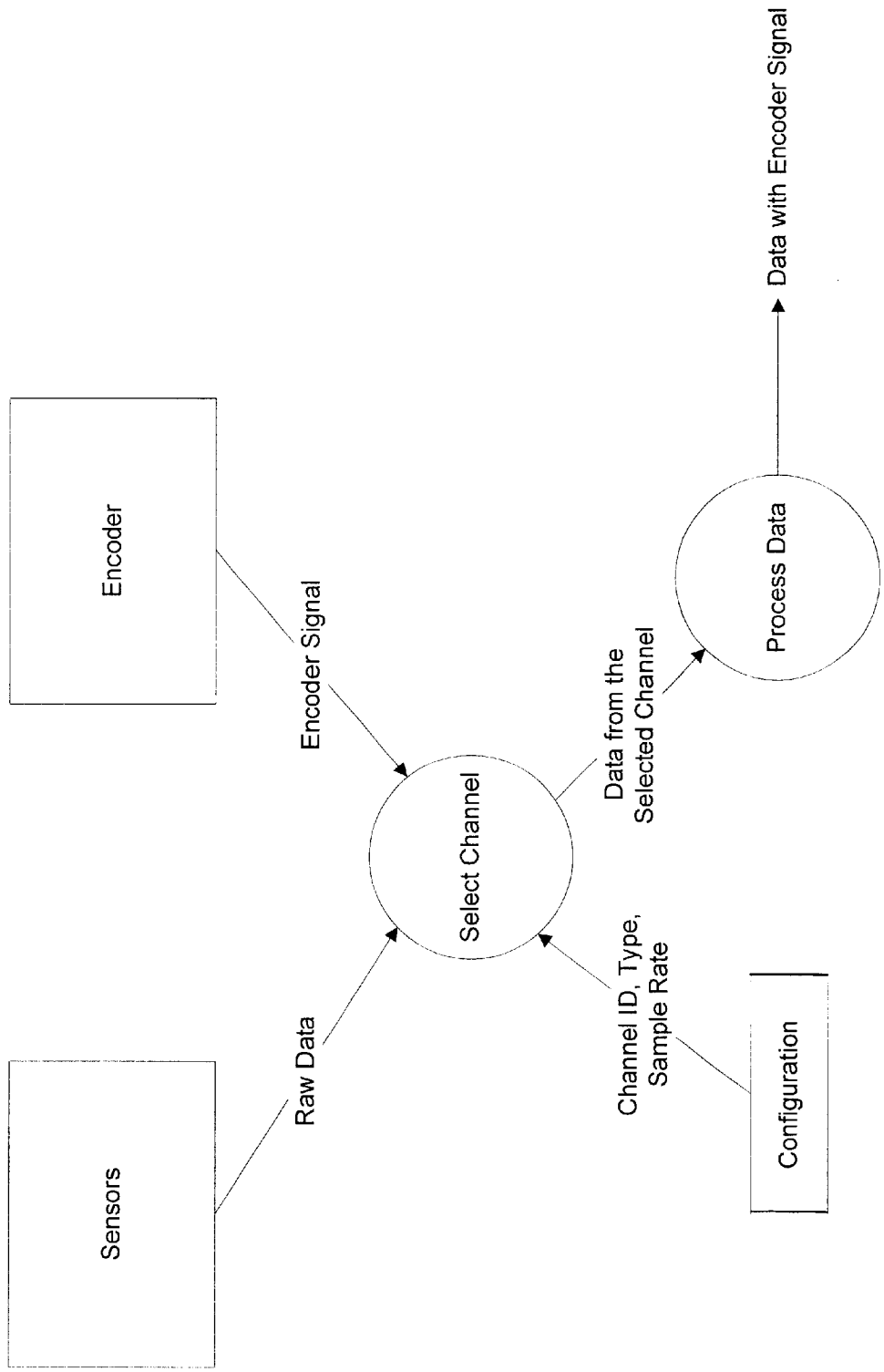

FIGS. 12A through 12G illustrate the data flow for the software processes implemented in the preferred embodiment, for performing Engine/Compressor monitoring and diagnostic functions. FIG. 12A is a level 0 diagram, showing the main data category exchange by the CONDOR 10 with systems external to the CONDOR 10, such as Direct sensors, users, Configuration and Data Managers, a database, Alarm registers, Registers for calculated results, and an external Modbus Device, for exchanging data with a DA&C 40. FIG. 12B is a level-1 diagram detailing the data flow processes shown in FIG. 12 A. FIGS. 12C through 12G are level-2 diagrams detailing the processes shown in FIG. 12B. Specifically, FIG. 12C illustrates the data flow for the configuration process, taking place between CM 80, DM 60, users and the CONDOR 10. FIG. 12D details the data flow in the communication process. FIG. 12E details the data flow in the calculation processes. FIG. 12F details the data flow in the alarm process. FIG. 12G details the data flow in the 'fast acquisition' process of acquiring raw data from direct sensors that require sampling at high-rates.

Figure 13A:
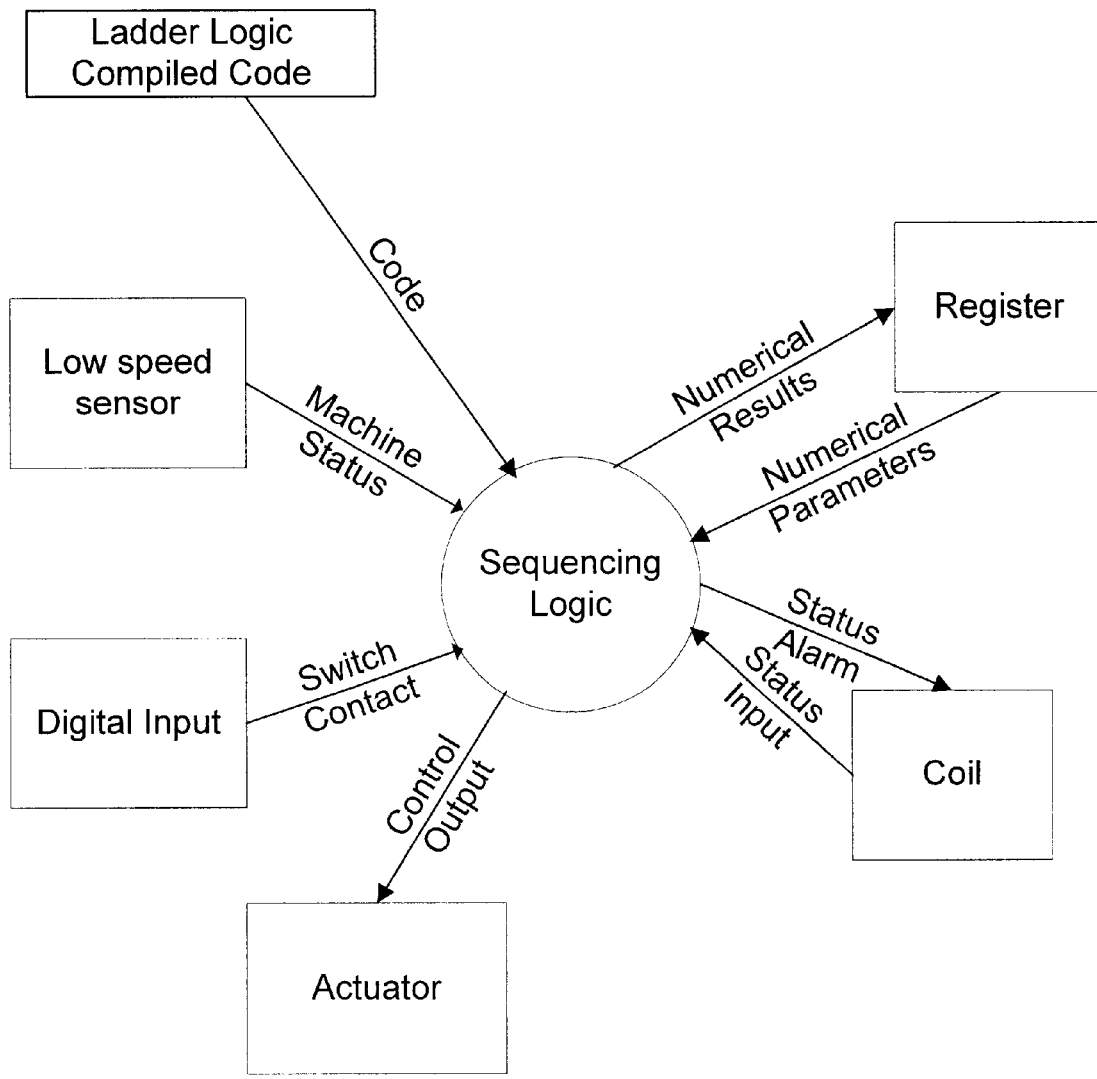
FIGS. 13A–13B are level-1 and level-2 data flow diagrams of the sequencing logic performed by the IMCS system of the preferred embodiment of the invention, for achieving the functions of shut-down and control of an engine/compressor
Figure 13B:
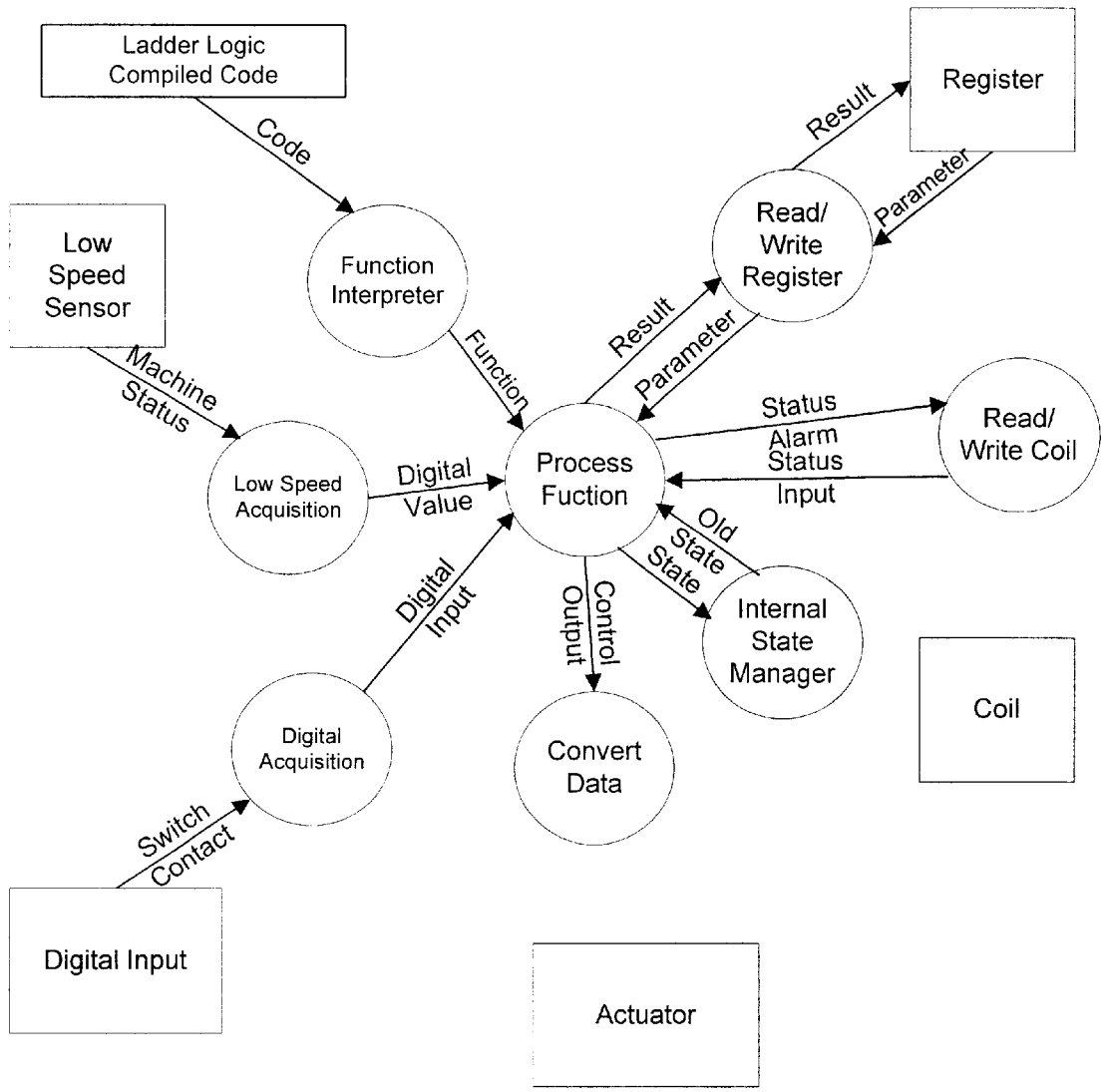

The input sensor data can be combined in logical and or mathematical means to perform a desired action such as controlling an output. Sequencing logic is used to set the conditions for a machinery shut down or start-up or the initiation of a warning message. As well, mathematical calculations can be defined for control outputs or user information. This is an activity that performs the same action as a PLC. The implementation is by ladder logic or by similar means such as flow diagrams or a software language. The sequence logic is implemented from start to finish and repeated so long as the system software is operating. FIGS. 13A and 13B illustrate level-0 and level-1 data flow diagrams for the sequencing logic for the shutdown and control processes in the preferred embodiment of the invention.

The preferred embodiment also features a process referred to as 'status', which monitors the status of other processes. If a process is not working properly, the 'status' process can restart the process. The 'status' process can also show the current status of other processes.

In the preferred embodiment, data can be accessed in different ways. It can be obtained through Modbus, in which case data is indexed by the Modbus device address and the Modbus register. Data directly from the sensor channels may also require accessing. In this case, data is indexed by the mux number and the channel number. Furthermore, data to be accessed could also be a calculated result and stored in the memory.

Figure 14:
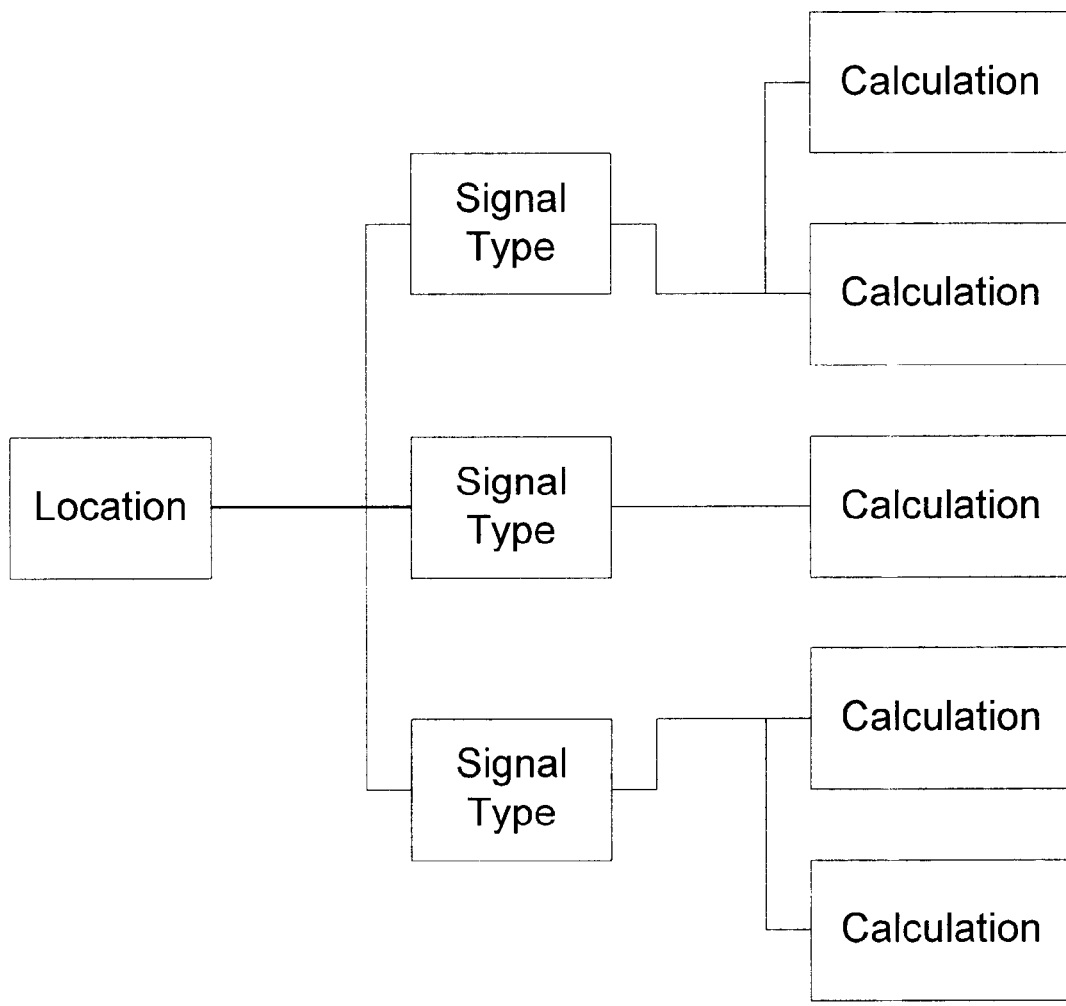
FIG. 14 is a diagram describing the data indexing process within the CONDOR unit of FIG. 2.

To simplify the data accessing, in the preferred embodiment data is indexed by location, i.e. Modbus, channel or memory, signal type and calculation for which it is required. Data transfer, data readings and other processing requiring data access, are considered to be calculations, for the purpose of describing the data indexing process. FIG. 14 illustrates the data indexing process. For each data, after the signal type and location are specified, all possible calculations in which that data may be required, based on the known location and signal type are determined, and a final indices are assigned to the data. Thus, when a specific calculation is required, the system has immediate access to all necessary data. For external data communication, data is still indexed by the Modbus address. This mode of indexing data automates the data accessing process, by comparison to traditional data acquisition systems in which individual calculation blocks are set-up for every channel configuration and the similarity in functionality of various calculation blocks, regardless of signal type and location is not explored.

The primary communication protocol in the preferred embodiment is Modbus. The blocks communicating by Modbus can act as both Modbus master and Modbus slave. Modbus communication becomes a bottleneck of the system. To optimize the communication, three special designs are added to the preferred embodiment:

a) Shared memory
    There is a special trunk of memory to be shared by all processes. Any process can access the data using an internal fast indexing.

b) Common register
    Two data with the same signal type, location and calculation will share the same internal memory location, although they can have different Modbus addresses. If two data with the same signal type, location and calculation with one Modbus slave address and one Modbus master address, they share the same memory location. In this case, the data from the slave will "immediately" go to the master when the slave data is obtained. There is no copying involved. However, in the user point of view, the data is similarly coming from the slave device and copying to the master.

c) Image process
    There is a module mainly taking care of the Modbus register (shared memory). When this module is running, another copy will be created and executed. One of the copies will reply the request the Modbus master device, and the other copy will acquire the data from the slave constantly. Since the system software is running in a multi-tasking environment, when one of the copies is waiting for the serial port, the other copy can use this time period to reply the message to the serial port.

A secondary communication protocol of the preferred embodiment is TCP/IP. For example, a personal computer with TCP/IP can be connected to the IMCS system 1. The basic functions involve FTP and Telnet. There is also a module that provides a socket for TCP/IP communication. Commands can be sent to this module, called a command interpreter. The command interpreter interprets commands sent through FTP. When a command file exist, the command interpreter will execute the commands in the file. Once it finishes, it will remove the file so that it will not execute it again. Most of the commands generally require other process to update the configuration without restarting the whole system.

The ability to acquire a contiguous (uninterrupted) set of samples from an analog to digital converter at rates at or above 20,000 samples per second or more is not done by control systems such as PLCs. A typical contiguous sample period might be as long as 2 seconds, which could be the equivalent of more than 40,000 samples. This is incompatible with a control or shutdown system which must loop through the ladder logic or flow diagram within the required time period, such as 0.5 s or less. The IMCS system 1 allows the sample acquisition from the an analog to digital converter to proceed in an uninterrupted fashion while still performing the ladder logic and control loops at more than 20 times per second. In addition, the serial communications channels can be serviced without a significant time delay (in less than 1 second).

Since the whole data set contains the dynamic information of the machine, many different calculation and analysis can be applied on it. To acquire the data in high frequency, DMA transfer and interrupts are used as follows. The whole dynamic data acquisition is done through DMA transfer in background. This lets the main processor, CPU, to have more time to do other processes. The DMA buffer has limited size. The CPU uses interrupts to change the DMA buffer when the buffer has been filled up. In each acquisition cycle, only two signals are acquired: data signal and encoder signal. The data signal contains the data and the encoder signal contains the timing information. The system SW uses the timing information to extract the useful part of the data signal. Data from HSA and LSA is acquired independently such that the high-speed acquisition process does not affect the control/shutdown parts of CONDOR. The dynamic (fast) channel(s) may be acquired in Round-Robin fashion. This means the performance of the dynamic acquisition is independent on the number of channels of the IMCS system 1.

In the preferred embodiment, all calculations have 20 alarm limits (both lower and upper limits), which can be specified. They are grouped by ranks. In other words, there are 20 different ranks of alarms. If a calculation is outside the limits, the corresponding alarm will be activated. The system will turn into the corresponding rank if there is no other higher rank being activated. On the other hand, the system disables the alarm if there is no other higher rank being activated.

Figure 15:
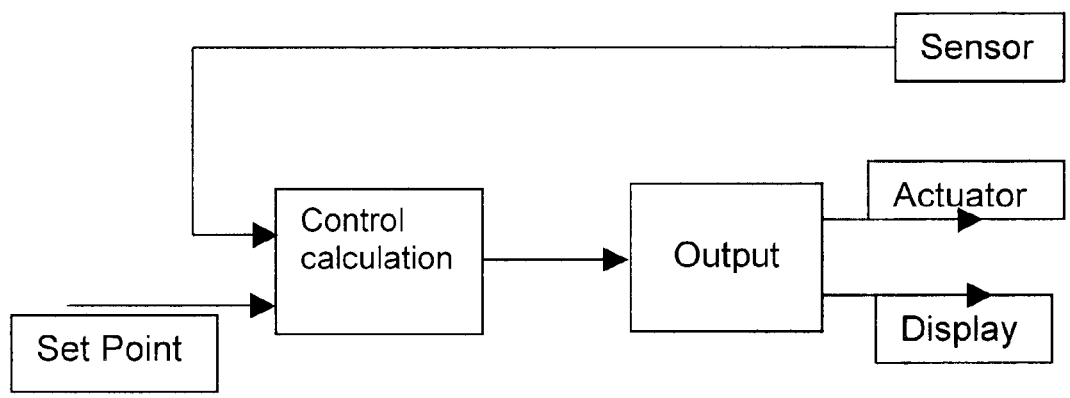
FIG. 15 is a diagram showing a control loop performed within the IMCS system for performing the control function, in one aspect of the invention.

In addition to acquiring data for monitoring, diagnostics and shutdown function, the CONDOR 10 also calculates control algorithm set-points and outputs for controlling the machinery. A number of control loops are be defined in the software of the preferred embodiment of the IMCS system 1. Each control loop may run independently and at a different speed, i.e may be recalculated more or less often. FIG. 15 illustrates the inputs and outputs of a control loop. Generally, the control inputs and outputs are very important to a user, therefore in the preferred embodiment these signals are also displayed on user interfaces, in addition to being used in the control process. The CONDOR 10 has the ability to use several independent PID (proportional, integral and derivative) algorithms for the control functions.

For an improved diagnosis of machine faults, automated diagnosis techniques can be implemented by using the results of calculations, sensor signal values, and combination of conditions characteristic of known mechanical faults. The digital data from the sensors can either be stored for transmission to another computer, or can be processed using a range of data processing techniques to extract numerical information that relates either to the performance of the machinery or to a specific condition. The resulting numerical information can be stored or further reduced using standard database, electronic file, data compression, or averaging techniques. Example data processing techniques include frequency analysis with frequency transforms such as Fourier transforms, vector dot or array product, vector mathematical processes, matrix mathematics, digital filtering, peak value determination, threshold determination, rate of change (first derivative), multiple derivative, integration, averaging etc. It would be appreciated by a person skilled in the art that specific rules would vary according to the mechanical construction of the machinery, the sensor type, and the sensor placement.

Air-Fuel Control

Air-fuel control is one of the features performed by the IMCS system 1 when used to control an engine's performance. For spark ignited natural gas engines the air-fuel control is generally achieved by controlling the pressure of the air in the intake manifold relative to the amount of fuel or the amount of air supplied to an air-fuel mixing chamber.

In one aspect of the invention, the air fuel control is a real-time portion of the IMCS system 1, which does the air fuel ratio control. FIGS. 16A to 16G illustrate the data flow in the air-fuel control process as it occurs in the preferred embodiment of the invention.

Figure 16A:
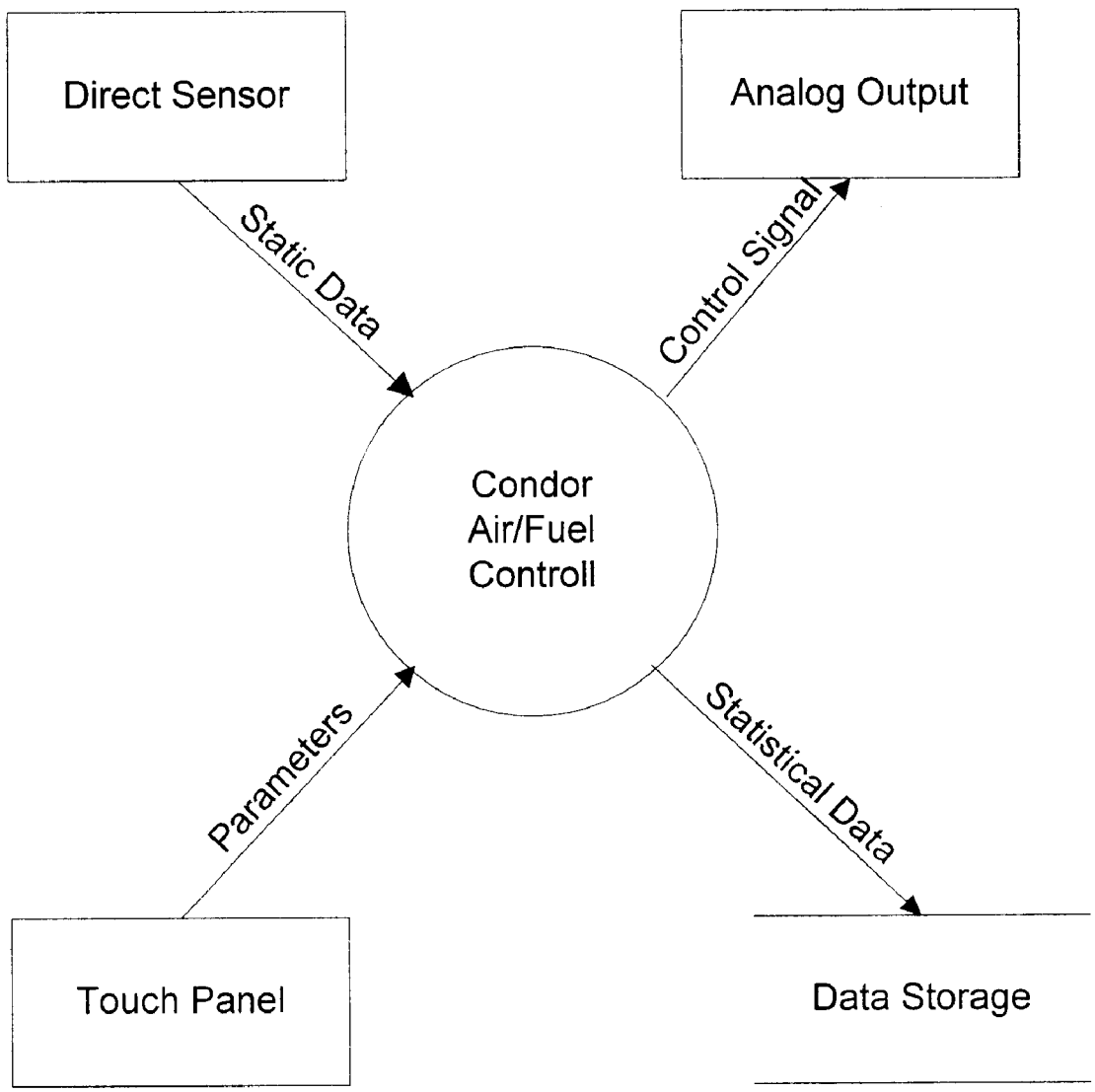
FIGS. 16A–16G are level-0, level-1 and level-2 data flow diagrams for the air-fuel control process performed by the IMCS system of the preferred embodiment.
Figure 16B:
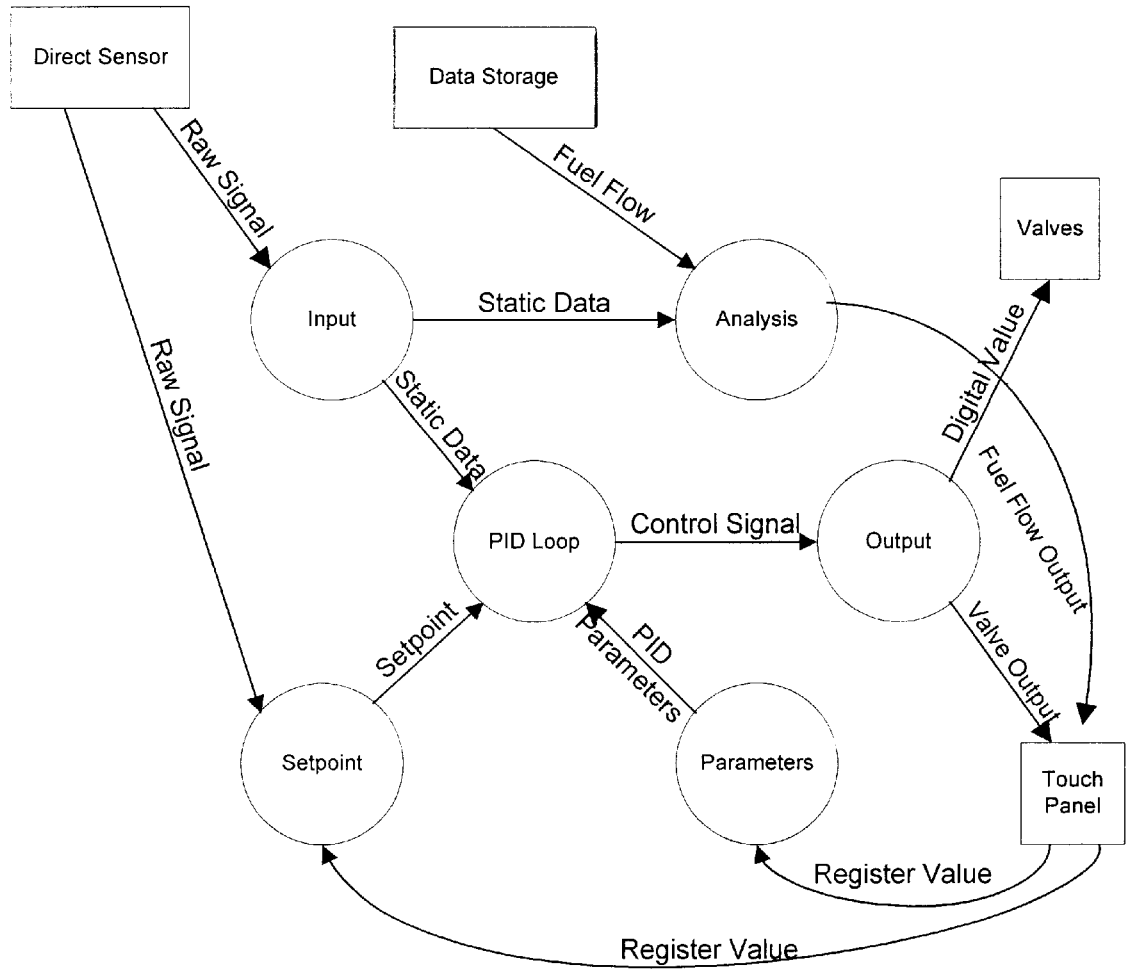
Figure 16C:
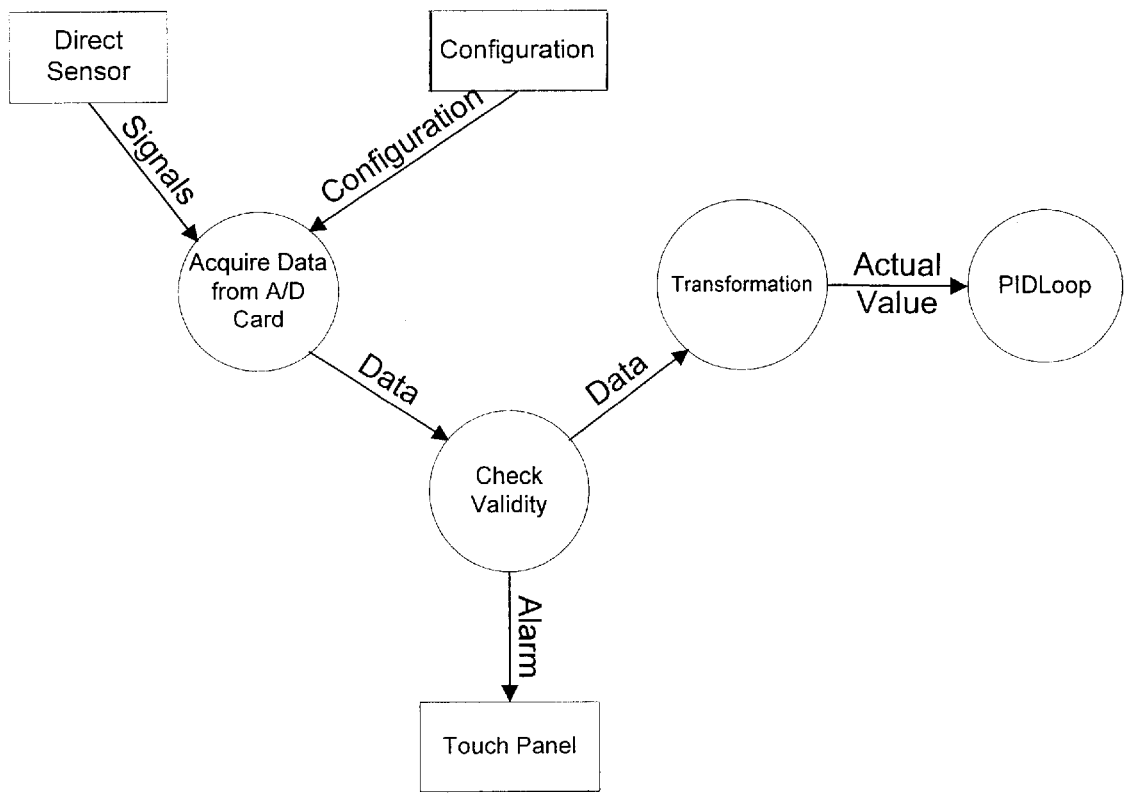
Figure 16D:
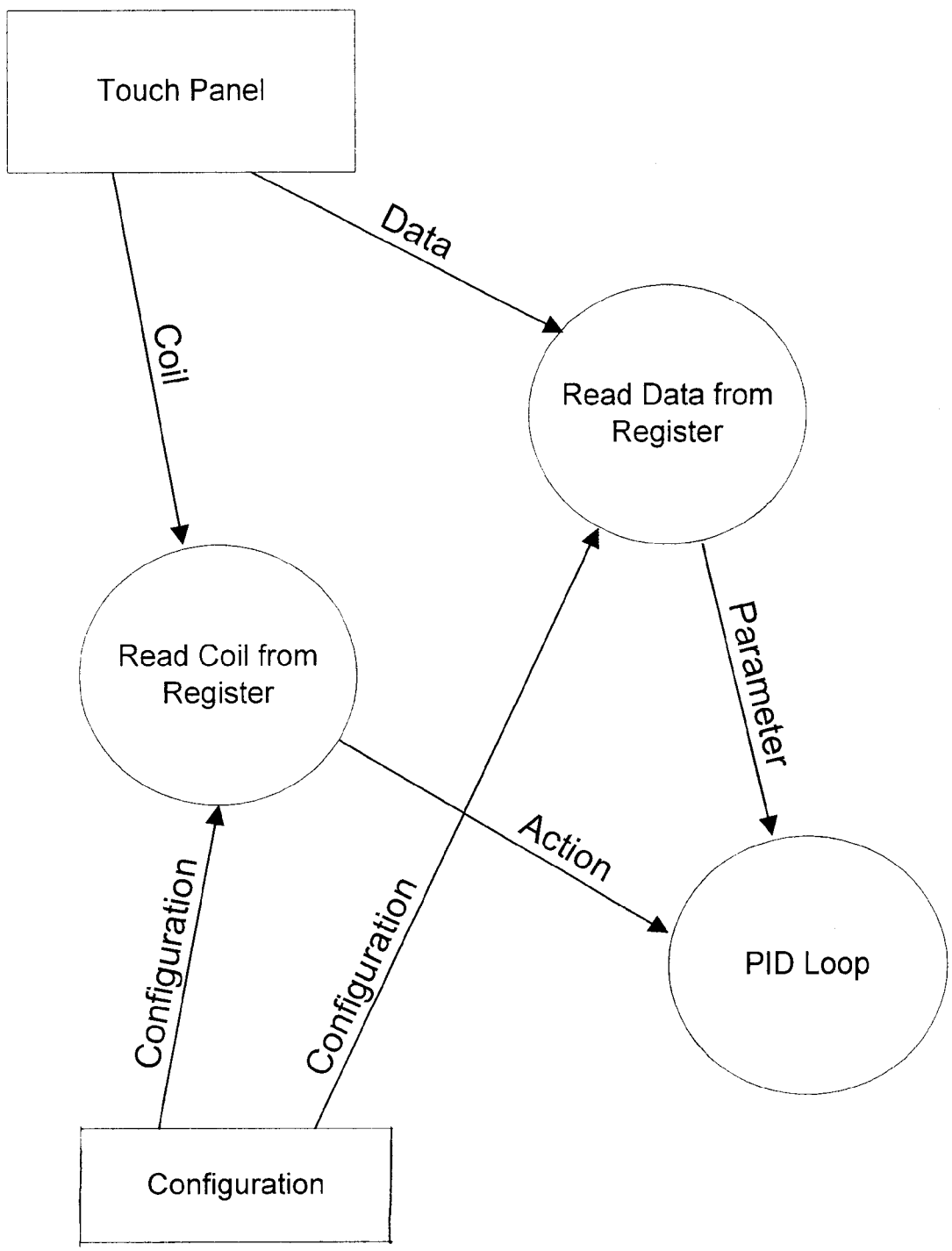
Figure 16E:
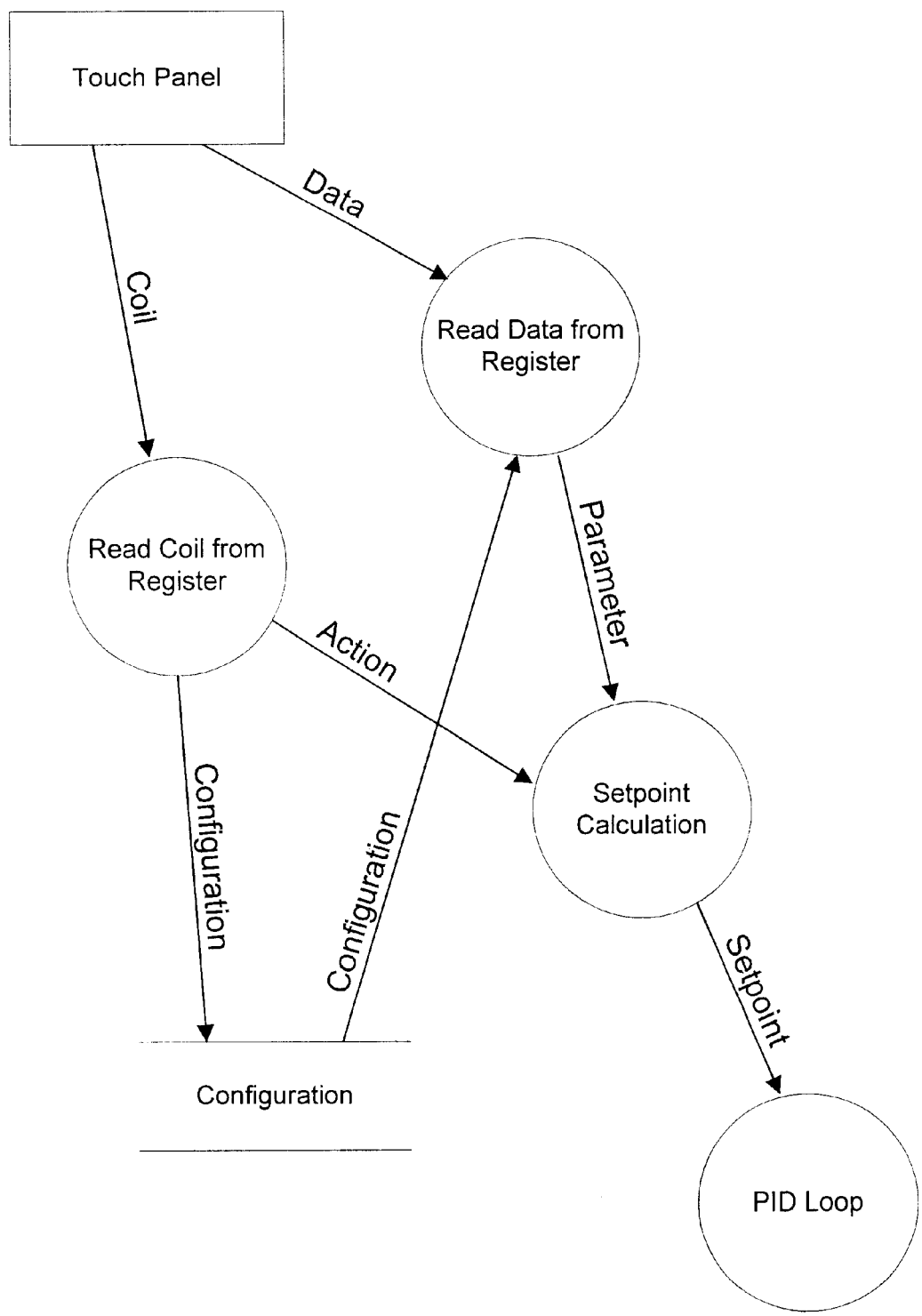
Figure 16F:
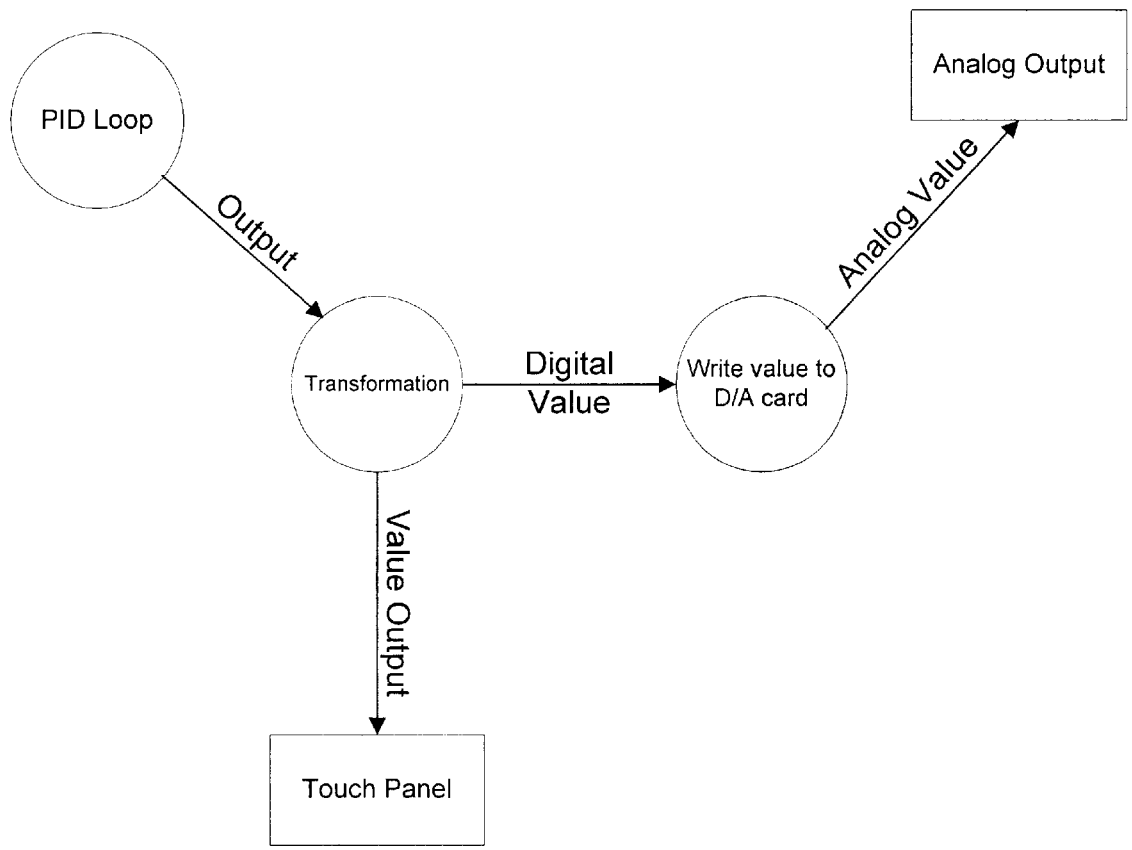
Figure 16G:
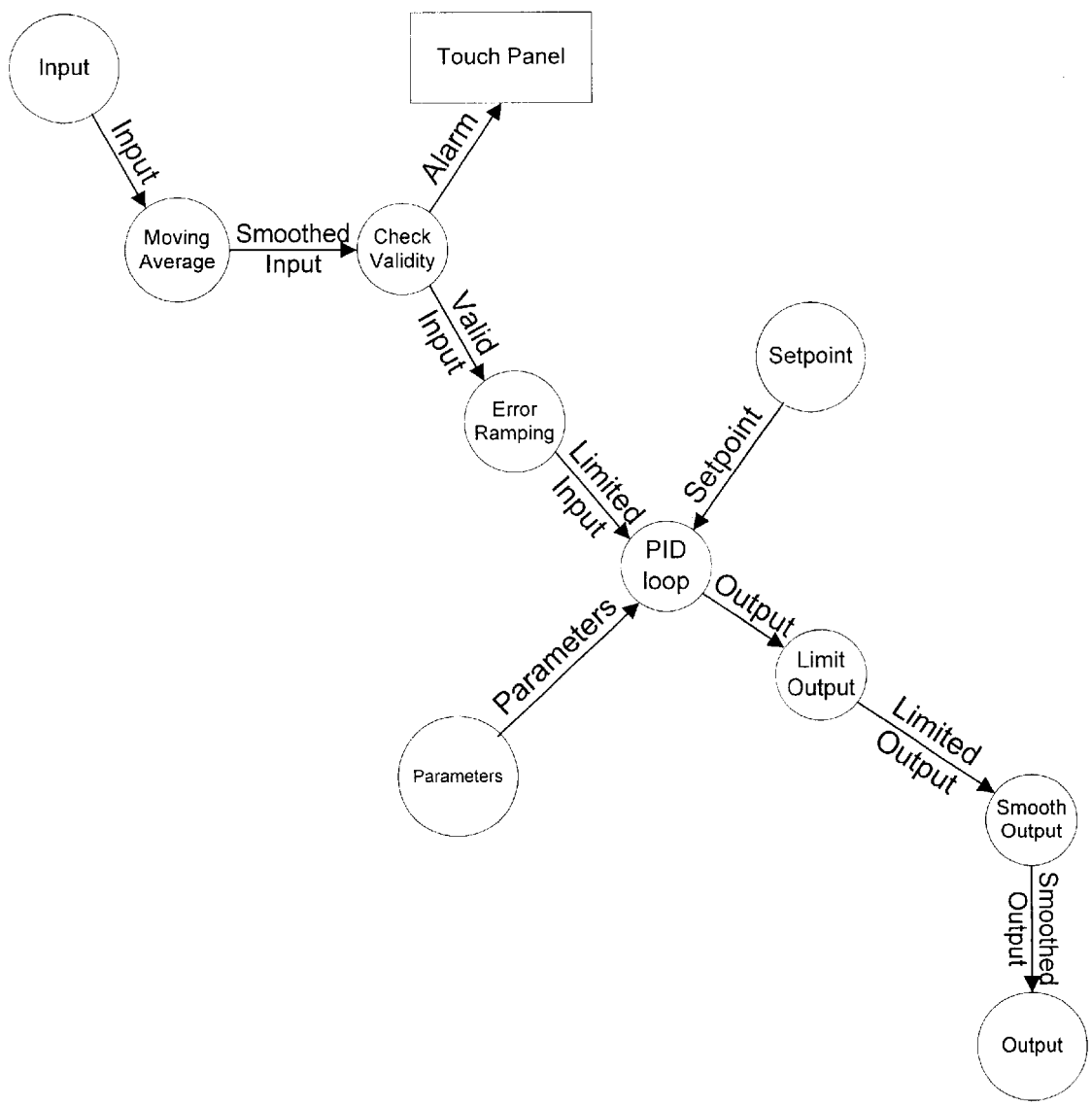

FIG. 16A is a level-0 data flow diagram for the air-fuel control process. The CONDOR 1 acquires Data from a Direct Sensor, it acquires parameters from a touch panel of a user interfaces such of an HMI 70, the DCS 50 or the DM 60. The CONDOR 10 also stores statistical data in a data storage unit, and sends control signals to an analog output. FIG. 16B is a level-1 data flow diagram detailing the processes illustrated in FIG. 16A. The air fuel-control is done through a PID control loop. FIGS. 16C to 16G are level-2 data flow diagrams for the air-fuel control process. They detail respectively: a) the data input subprocess; b) the subprocess of providing the required parameters to the PID loop, from the user interface and from a configuration unit, such as the CM 80, DM 60 or DCS 50 c) the subprocess of outputting results from the PID loop to the user interface and to the analog control device; and d) the data flow in the PID loop.

The air-fuel control system requires that PID loop controls are updated by a timer interrupt. For example, the timer interrupt may be set to be 10 ms. However, the PID loop only updates itself in the multiple of 50 ms. Since the system comprises a real-time operating system, it will guarantee that the PID loop process will get the interrupt in each 10 ms. During the idle time of the PID loop processes, the RTOS will schedule the task to do another process, such as serial communication.

Traditionally, the air fuel control is done by controlling the amount of air relative to the amount of fuel is normal. In the preferred embodiment, the IMCS system 1 calculates the amount of air according to fuel, as well as engine RPM and air temperature. The addition of these two other parameters other parameters results in more efficient operation over a wide range of speeds and air temperatures. In addition, in the preferred embodiment of the IMCS system 1, the air-fuel control is performed during a starting sequence. This results in more reliable starting and a reduced chance of "flooding" which is a condition of excess fuel relative to the air during a starting sequence. In the preferred embodiment, linear equations of the form y=mx+b where m is a slope, b is an offset, x is proportional to fuel, and y is proportional to the air pressure, are used in the air-fuel control process.

Combining Sensor Signals with a Marker Signal from a Rotation Shaft

In one embodiment of the invention, in the data acquisition process, the sampled sensor signals are acquired in combination with a marker signal from a rotation shaft. By sampling a machine sensor output and a sensor showing the rotational position of a shaft either at the same time or by interleaved samples, the sensor signal can be accurately correlated to the rotation position of the shaft or the position of any reciprocating or rotating components which are connected to the shaft whose position is being monitored. This allows determination of a more accurate rotational position than is possible by using a signal generated once per revolution and deducing the rotational position by interpolation.

Figure 17:
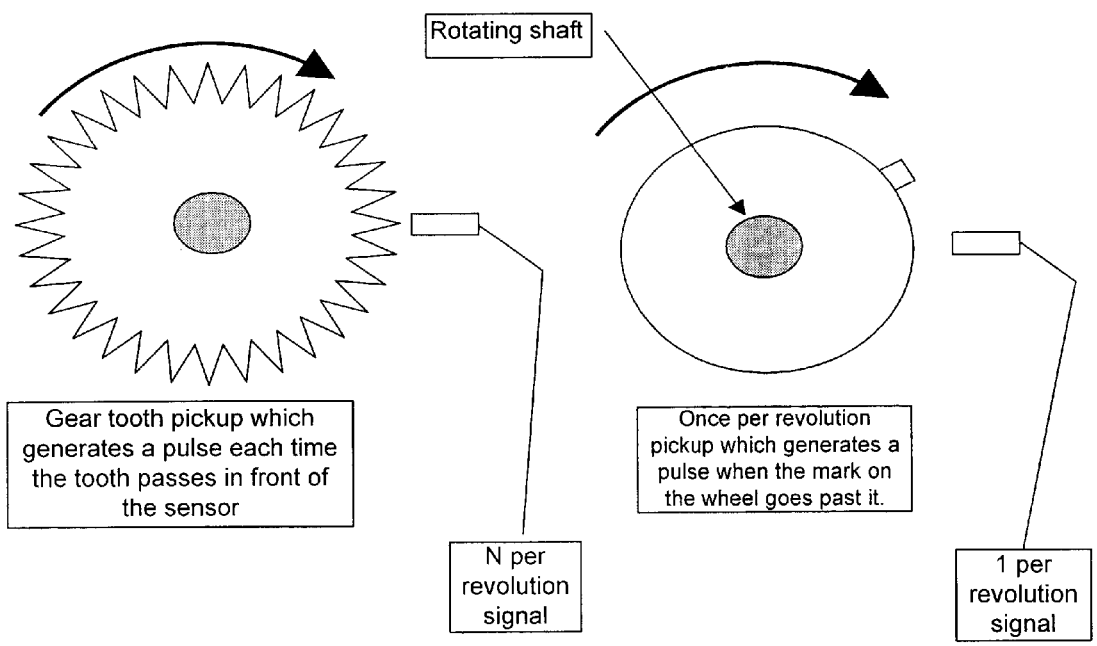
FIG. 17 is a diagram showing the signals acquired for a data acquisition process according to one aspect of the invention.
Figure 18:
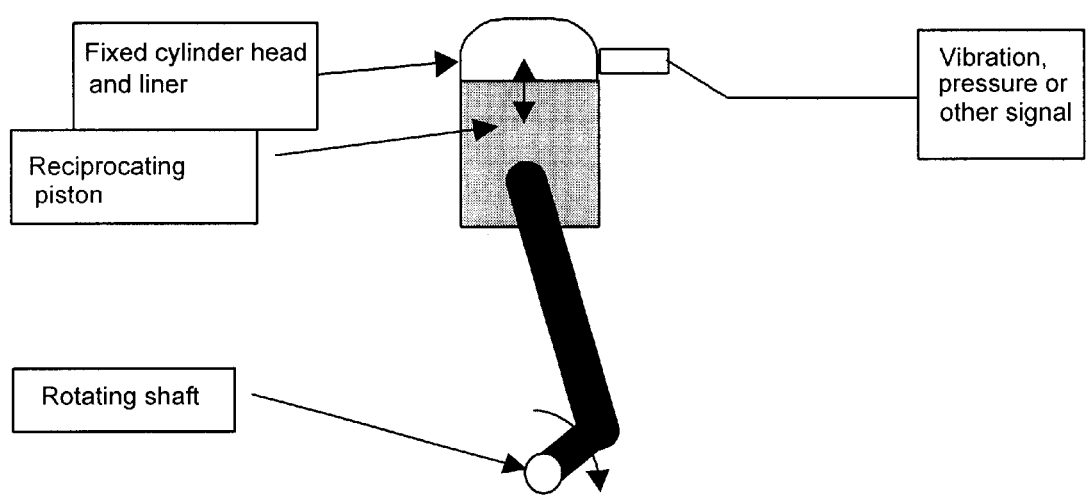
FIG. 18 is a diagram showing the parts of a general reciprocating system, on which the process in FIG. 17.
Figure 19:
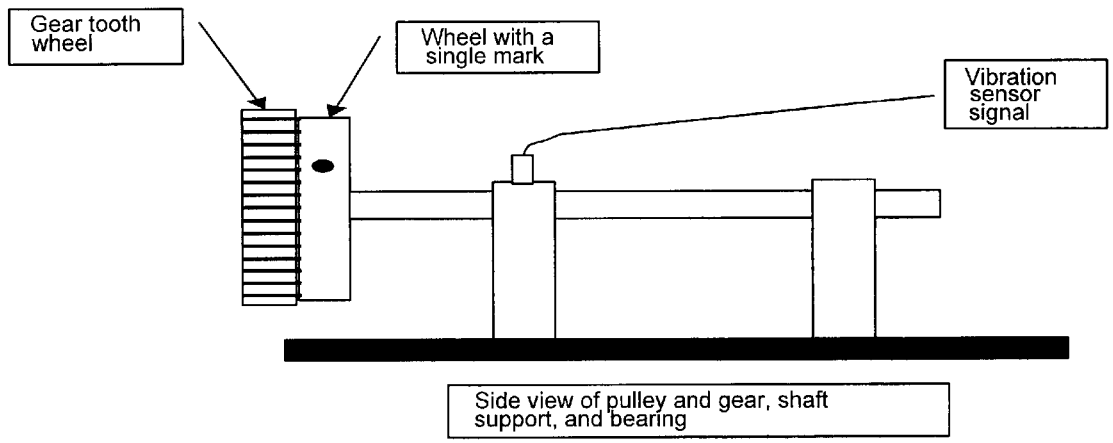
FIG. 19 is a diagram showing the parts of a general rotating system, on which the process in FIG. 17 is applied.
Figure 20:
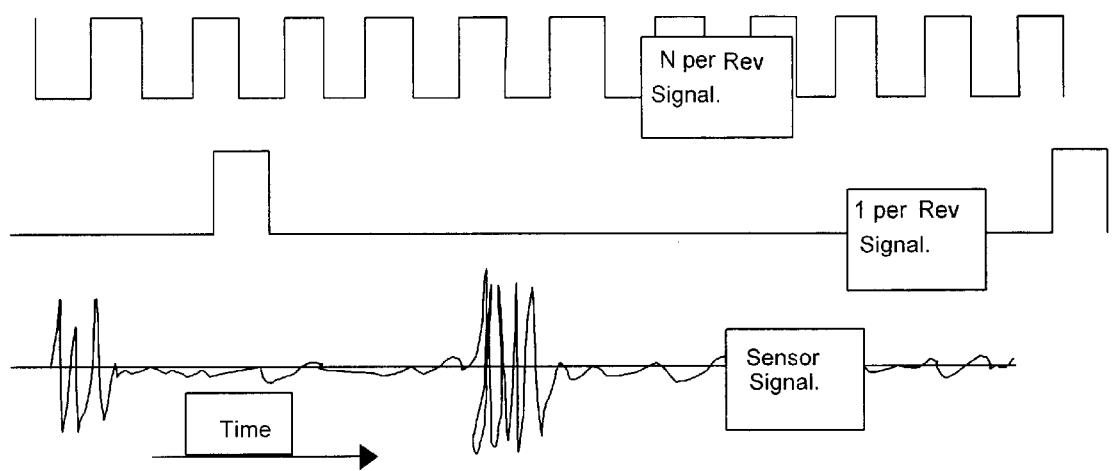
FIG. 20 is a diagram showing the correlation of signals in one embodiment of the data acquisition process in FIG. 17.

A method of acquiring correlated signals to indicate the exact rotational position of a shaft is described below, with reference to FIGS. 17 through 20. FIG. 17 shows the placement of the rotational pickup sensors. The vibration, pressure or other signal can originate from sensors fixed in place relative to the rotating or reciprocating parts. FIG. 18 shows the shaft causing a piston to reciprocate. FIG. 19 shows a side view of a general assembly of pulley and gear, shaft support and bearing and the placement of a vibrational sensor with respect to these rotating parts. FIG. 20 shows the correlation of a N per Rev signal, a 1 per rev signal and the signal from the sensor. An additional signal required for 4 cycle engines is a 1 per 2 Rev signal. By combining all of the above signals, the exact rotational position of the sensor signal(s) can be deduced. Combining the signals comprises the following steps:

a) Acquiring the signals with analog to digital converters and using the N per rev and 1 per rev to deduce an angle of rotation.

b) Electronically adding the N per Rev and 1 per Rev signals and acquiring the resulting signal and the sensor signal with analog to digital converters and using the N per rev and 1 per rev to deduce an angle of rotation.

c) Acquiring the three signals with a multiplexer leading to an analog to digital converter and using the N per rev and 1 per rev to reduce an angle of rotation.

d) Electronically adding the N per Rev and 1 per Rev signals and acquiring the two signals with a multiplexer leading to an analog to digital converter and using the N per rev and 1 per rev to deduce an angle of rotation.

e) Acquiring the vibration signal with an analog to digital converter and using the N per rev and the 1 per rev signals as two of the bits of the digital word making up a sensor sample. Typically the two high order or low order bits are used as shown by the following example 16 bit word: '0123456789abcdef'. In this 16 bit word where each bit location is shown by the digits 0 to 9 and the letters a to f inclusive, the 1 per rev and N per rev status (high=1, low=0) can be superimposed on the digital word representing the value of the analog signal.

According to the above, the interleaving of the rotational position signals with the sensor signal enables the rotational position to be determined with considerable accuracy.

The IMCS system 1 can be applied to any machinery for one or more of monitoring, diagnostics, shutdown, control and communications. The classes of machinery include the groups of rotating and reciprocating machine types. Rotating machines include pumps, compressors, propellers, generators, turbines (turbochargers, turbofans, rotary compressors), and rotary engines. Reciprocating machines include reciprocating engines (2 and 4 cycle), reciprocating compressors, and reciprocating pumps.

Several techniques which can be applied with the IMCS system 1 to fulfill the diagnostics of reciprocating machinery such as engines and compressors are described below.

a) For 4 cycle engines, vibration sensors can be used to detect looseness in the connecting rod bearing or bushing, wrist pin bearing or bushing, and the main crankshaft bearings by the detection of a signal when the piston is in the vicinity of the top dead center between the exhaust and intake strokes. By looking for a signal only when the piston is at this position, the problem can be attributed to such looseness. This capability is possible due to the acquisition of a rotational position signal at the same time as the sensor signal. A preferred sensor location is near to the crankshaft, but the sensor can be located at other physical locations on the engine to achieve similar results.

b) For most reciprocating engines with natural gas fuel and spark ignition a vibration sensor located in the crankcase region can be used to detect uncontrolled combustion known as detonation. By looking for a vibration signal during the crank position in the combustion region, detonation can be detected. A preferred sensor location is near to the crankshaft, but the sensor can be located at other physical locations on the engine to achieve similar results.

c) For double acting compressors used for compressing gas, a vibration sensor can be used in the region of the cross-head to detect looseness in the cross-head, the connecting rod bearings, and the piston attached to the rod. By looking for a vibration signal during the crank position when the force acting along a line connecting the axis of the piston and the center line of the crankshaft reverses direction, a mechanical problem due to looseness can be detected.

Figure 21:
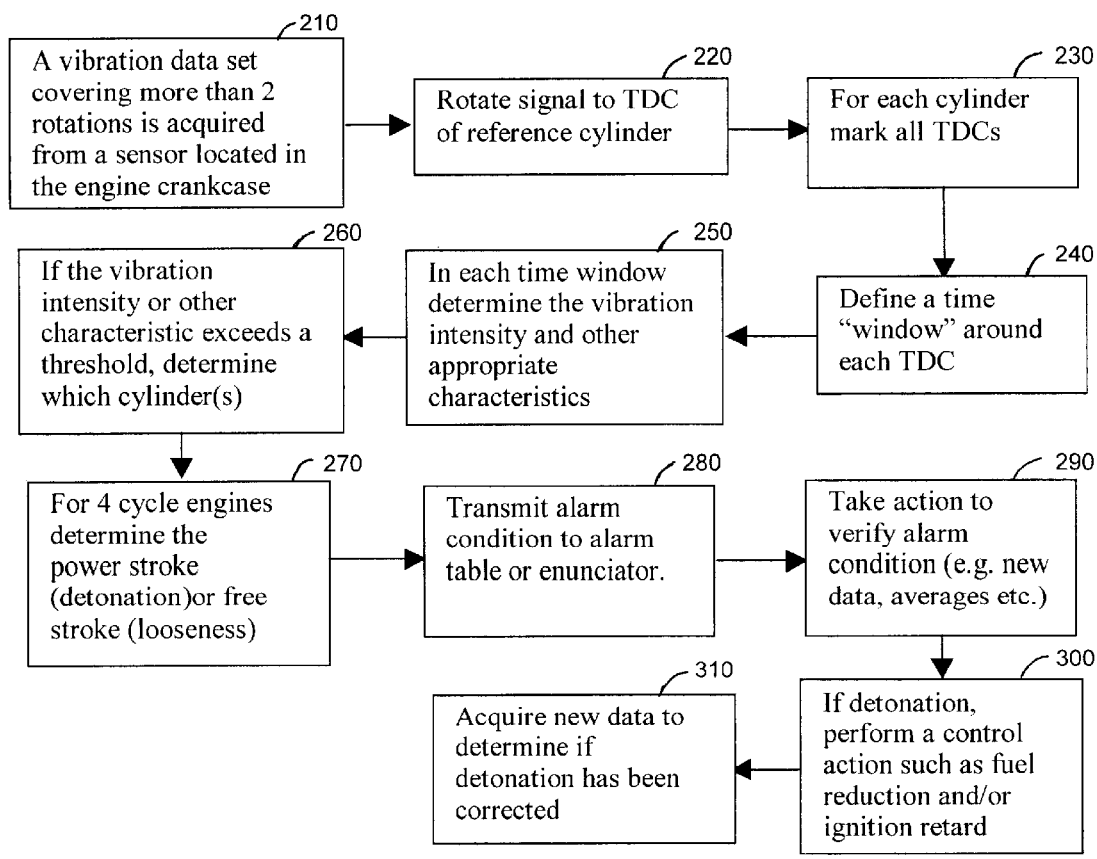
FIG. 21 is a flow chart of a method of determining detonation in an engine/compressor, according to another aspect of the invention.

The block diagram of the processes used is shown in FIG. 21. The vibration or equivalent sensor used to determine impact events is attached to a location near an engine crankshaft. A preferred orientation is such that the sensor is most sensitive to vibration in the direction of piston travel.

FIG. 21 is a flow chart illustrating the data acquisition process performed to determine if a looseness or detonation condition exists: A contiguous vibration data set covering a minimum of 2 revolutions for a 2 cycle engine and three revolutions for a 4 cycle engine is acquired at step 210. The sample rate must be high enough that frequency components above 1000 Hz can be acquired. Next, at step 220, using a rotational signal or timing data also acquired, the data set is truncated such that the data set starts at the Power top dead center (TDC) of the reference cylinder (typically 1, 1L or 1R). At step 230, using the TDCs determined from the other cylinders from the timing diagram, the locations in the data set for the TDC of each cylinder is determined. At step 240, a time window in the region of each TDC is defined. At step 250, for each time window, the characteristics of the vibration data appropriate to a looseness condition or a detonation event are determined. Such a characteristic may be vibration intensity. At step 260, it is determined if the value of the characteristic determined above exceeds a threshold. If a threshold is exceeded, the cylinder number is determined and if the event is from the power stroke or the free stroke (4 cycle engine only). At this point the alarm may be enunciated, at step 270, or additional data may acquired by repeating steps 210 through 260, to verify the alarm. At 290, a control action is performed. For detonation the normal control actions are fuel reduction to the cylinder in question, reduction of the engine load, or retarding of the ignition, either for the whole engine or for the cylinder showing detonation. At 300, the data acquisition process is continued by performing steps 210 through 260 to determine if the control action was successful in reducing the detonation frequency and/or intensity.

For the application of detecting looseness in double acting compressors the use of a single sensor in the compressor crankcase in a manner similar to that described for an engine may be advantageous by comparison to current systems where a vibration sensor placed near the cross-head of each cylinder is used to detect impact events.

Numerous modifications, variations and adaptations may be made to the particular embodiments of the invention described in the documents attached herein, without departing from the scope of the invention, which is defined in the claims.

We claim:

1. An integrated monitoring, control and shut-down (IMCS) system for monitoring and controlling the operation of a machinery, comprising:

input ports for receiving input sensor signals grouped on sets according to a sensor class, indicative of conditions of the machinery and output ports for outputting control signals to actuators of the machinery;

signal conditioning means, specialized for each said sensor class for acquiring and conditioning said respective sets of sensor signals;

signal conversion means coupled to the input and output ports, for converting the input sensor signals into data samples and for converting control data into control signals;

memory means for storing a plurality of machine-specific software applications, comprising a communication application;

a data processor operating according to a plurality of software applications for processing the data samples into calculated values, sending selected calculated values to be stored into the memory means, and calculating said control data;

a communication bus coupling the data processor, the signal conversion means, said signal conditioning means and the memory means according to said communication application; and a power supply for providing power for the operation of the system;

a direct sensor and actuator array DSA connected to the input and output port, wherein said direct sensor and actuator array comprises:

a high speed sensor array for sampling high speed varying parameters of the machinery to provide high speed input sensor signals;

a low speed sensor array for sampling low speed varying parameters of the machinery to provide low speed input sensor signal;

an actuator array for driving said machinery according to said control signals.

2. The integrated monitoring, control and shut-down (IMCS) system in claim 1, wherein the signal conversion means convert selected input sensor signals in data samples sequentially, at high speed.

3. The integrated monitoring, control and shut-down (IMCS) system in claim 1, wherein the data processor comprises a central processing unit (CPU) and a direct memory access(DMA) chip.

4. The integrated monitoring, control and shut-down (IMCS) system in claim 1, wherein the software applications comprising a real-time-operation-system (RTOS) supporting software and an application specific software.

5. The integrated monitoring, control and shut-down (IMCS) system in claim 4, wherein the application specific software comprises a plurality of processes related to the monitoring, control and shut-down of the machinery.

6. The integrated monitoring, control and shut-down system in claim 5, wherein the processes run on a multitasking, priority scheduling basis.

7. The integrated monitoring, control and shut-down (IMCS) system in claim 5, wherein processes comprise an interprocess communication protocol allowing communication with processes running on a second system, the second system being connected in a network with the IMCS system.

8. The IMCS system in claim 1, wherein the software applications comprising communication protocols for internal communication within the IMCS system and for external communication with other system connected in a network.

9. An IMCS as in claim 1, wherein said high speed sensor array includes at least a dynamic pressure sensor, an accelerometer sensor for vibration measurement, and an electrical current sensor.

10. An IMCS as claimed in claim 9, wherein said high speed sensor array comprises one accelerometer sensor placed in the compressor crankcase of a double acting compressor machinery.

11. An IMCS as in claim 1, wherein said low speed sensor array comprises at least a process temperature sensor.

12. An IMCS as in claim 1, wherein said signal conditioning means is a signal conditioning card comprising:

a plurality of conditioning modules, each for conditioning one of said sets in analog format; and a multiplexer for selecting the conditioned sensor signals transmitted at a certain moment to said data processor.

13. An IMCS as in claim 12, wherein said conditioning card further comprises a test point associated with one or more sensor signals.

14. An IMCS as claimed in claim 1, further comprising a watchdog timer circuit for receiving a trigger pulse from said data processor at preset time intervals and triggering an alarm in the absence of said trigger pulse.

15. An IMCS as in claim 1, further comprising a data manager for performing one or more of post-processing sensor data, communication over network, engine controller, and providing graphical user interface.

16. A method for monitoring, control and shut-down of a machinery of the type provided with a rotating shaft, a plurality of high speed and low speed sensors for monitoring a plurality of high speed varying and low speed varying of parameters of interest, respectively; and a plurality of drivers for operating various parts of said machinery, said method comprising:

collecting a plurality of high speed and low speed sensor signals from said sensors and providing same to a collection and data acquisition organizer for processing;

providing said collection and data acquisition organizer with software applications specific for operating said machinery, and with an input/output interface to said sensors and said drivers;

generating at said collection and data acquisition organizer a plurality of control signal calculated based on said sensor signals;

controlling said drivers with said control signals, wherein said collection and data acquisition organizer operates in a normal, an alarm and a shut-down state.

17. A method as in claim 16, wherein said step of generating comprises, during said normal state:

(a) processing a plurality of sensor signals over a first time window into a first sensor data and storing said first sensor data;

(b) processing a plurality of sensor signals over a next time window into a second sensor data and storing said second sensor data;

(c) comparing said first and second sensor data with preset thresholds to detect an abnormal condition;

(d) repeating steps (a) and (c) for a pre-set number of windows; and (e) calculating said control data from said sensor data collected over said pre-set number of windows if an abnormal condition is not detected.

18. A method as claimed in claim 17, wherein said step (a) comprises:

sampling a condition sensor indicating a condition of the rotating equipment that requires monitoring, for obtaining a condition signal;

sampling a marker sensor indicating the rotational position of said shaft, for obtaining a rotation marker signal; and combining the condition signal and the rotation marker signal.

19. The data acquisition process in claim 18, wherein the sampling of the condition sensor and the sampling of the marker sensor are performed simultaneously.

20. The data acquisition process in claim 18, wherein the sampling of the condition sensor and the sampling of the marker sensor are interleaved.

21. A method as claimed in claim 16, wherein said step of generating comprises:

acquiring a vibration signal from a vibration sensor;

combining the vibration signal with a timing signal to obtain a correlated signal;

comparing the correlating signal with a predetermined condition to determine whether an abnormal condition exists.

* * * * *